(12) United States Patent
Sloman

(10) Patent No.: US 11,279,494 B2
(45) Date of Patent: Mar. 22, 2022

(54) EMERGENCY LANDING APPARATUS DEPLOYMENT FOR EMERGENCY LANDING OF AIRCRAFT

(71) Applicant: ACTIVE VTOL CRASH PREVENTION LIMITED, Derby (GB)

(72) Inventor: Roger Mark Sloman, Derbyshire (GB)

(73) Assignee: Active VTOL Crash Prevention Limited, Derby (GB)

(*) Notice: Subject to any disclaimer, the term of this patent is extended or adjusted under 35 U.S.C. 154(b) by 29 days.

(21) Appl. No.: 16/757,717

(22) PCT Filed: Oct. 19, 2018

(86) PCT No.: PCT/GB2018/053031
§ 371 (c)(1),
(2) Date: Apr. 20, 2020

(87) PCT Pub. No.: WO2019/077365
PCT Pub. Date: Apr. 25, 2019

(65) Prior Publication Data
US 2020/0369391 A1 Nov. 26, 2020

(30) Foreign Application Priority Data

Oct. 20, 2017 (GB) .................................... 1717267
Mar. 29, 2018 (GB) .................................... 1805159

(51) Int. Cl.
*B64D 17/80* (2006.01)
*B64D 17/72* (2006.01)
(Continued)

(52) U.S. Cl.
CPC ............. *B64D 17/80* (2013.01); *B64D 17/72* (2013.01); *B64D 27/023* (2013.01); *B64D 31/06* (2013.01);
(Continued)

(58) Field of Classification Search
CPC ...... B64D 17/80; B64D 17/72; B64D 27/023; B64D 31/06; B64D 17/38; B64D 33/04; B64D 25/00; B64C 15/14; F02K 9/40
See application file for complete search history.

(56) References Cited

U.S. PATENT DOCUMENTS 1,019,271 A * 3/1912 Nelson ................... B64D 17/72
244/146
1,855,320 A 4/1932 Schwabek
(Continued)

FOREIGN PATENT DOCUMENTS

| DE | 19854410 C1 | 3/2000 |
|---|---|---|
| GB | 958548 A | 5/1964 |
| RU | 2162810 C2 | 2/2001 |

OTHER PUBLICATIONS

United Kingdom Patent Application No. GB180515.9, Examination Report dated May 1, 2021, 5 pages.
(Continued)

*Primary Examiner* — Assres H Woldemaryam
(74) *Attorney, Agent, or Firm* — Han Santos, PLLC

(57) ABSTRACT

An emergency landing apparatus for an aircraft and a method of operating the emergency landing apparatus is provided. The emergency landing apparatus comprises: one or more rocket motors arranged to eject efflux in order to provide upwards thrust to control descent of the aircraft during emergency landing of the aircraft; and control circuitry configured to: cause the one or more rocket motors to eject efflux and provide upwards thrust to control descent of the aircraft during emergency landing of the aircraft; and cause redirection of the efflux ejected by the one or more rocket motors, during the emergency landing of the aircraft, in order to reduce the upwards thrust provided by the one or more rocket motors.

18 Claims, 30 Drawing Sheets

(51) Int. Cl.
    *B64D 27/02*     (2006.01)
    *B64D 31/06*     (2006.01)
    *B64C 15/14*     (2006.01)
    *B64D 17/38*     (2006.01)
    *F02K 9/40*     (2006.01)

(52) U.S. Cl.
    CPC .............. *B64C 15/14* (2013.01); *B64D 17/38* (2013.01); *F02K 9/40* (2013.01)

(56) References Cited

U.S. PATENT DOCUMENTS

| | | | |
|---|---|---|---|
| 3,116,901 A | | 1/1964 | Stencel |
| 3,983,785 A | * | 10/1976 | Dissmeyer .............. F41A 19/69 89/1.812 |
| 4,050,657 A | * | 9/1977 | Murphy ................. B64D 17/80 244/139 |
| 4,105,173 A | * | 8/1978 | Bucker .................... A62B 1/22 182/3 |
| 4,676,457 A | | 6/1987 | Allen |
| 4,711,178 A | * | 12/1987 | Argyrakis ............... F41G 7/222 102/384 |
| 5,080,305 A | * | 1/1992 | Stencel ................... B64D 1/14 102/384 |
| 5,765,778 A | | 6/1998 | Otsuka |
| 5,836,544 A | * | 11/1998 | Gentile .................. B64D 25/00 244/17.17 |
| 6,565,041 B1 | * | 5/2003 | Young .................... B64C 39/024 244/139 |
| 8,191,831 B2 | * | 6/2012 | Nadir .................... B64C 39/024 244/149 |
| 10,507,929 B1 | * | 12/2019 | Vander Lind ........ B64D 17/725 |
| 2002/0070315 A1 | * | 6/2002 | Hilliard ................ B64D 17/025 244/139 |
| 2009/0306836 A1 | * | 12/2009 | Ausman .................. G01D 7/00 701/3 |
| 2012/0234968 A1 | * | 9/2012 | Smith .................... B64D 17/64 244/12.3 |
| 2017/0233086 A1 | * | 8/2017 | Homan .................. B64C 13/18 244/139 |
| 2018/0011487 A1 | * | 1/2018 | Robertson ............ G05D 1/0061 |

OTHER PUBLICATIONS

International Application No. PCT/GB2018/053031, International Search Report and Written Opinion dated Apr. 25, 2019, 21 pages.
United Kingdom Application No. GB1805159.9, Examination Report dated Jul. 28, 2021, 4 pages.

* cited by examiner

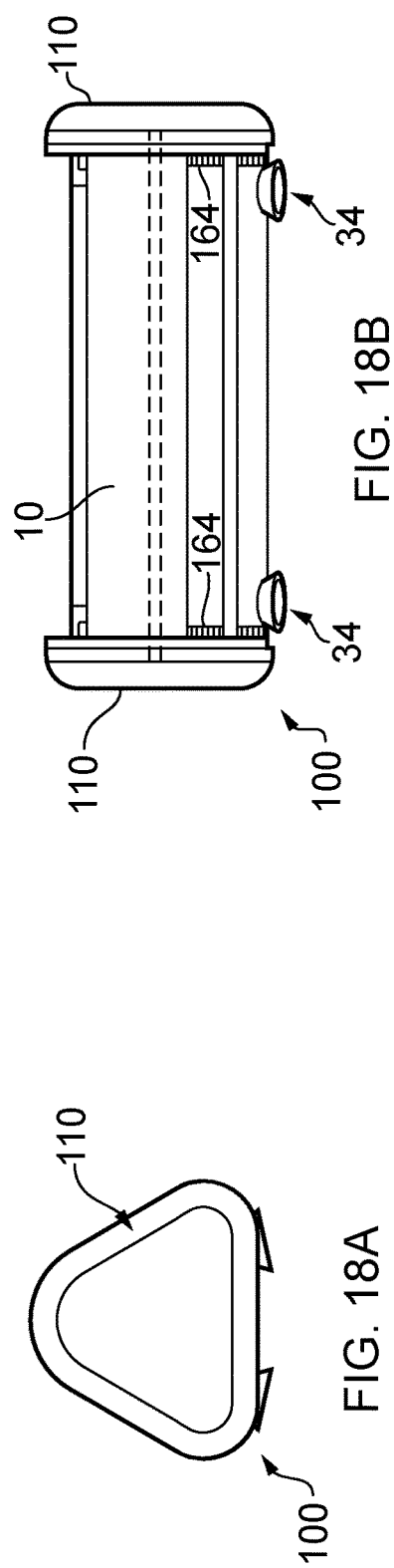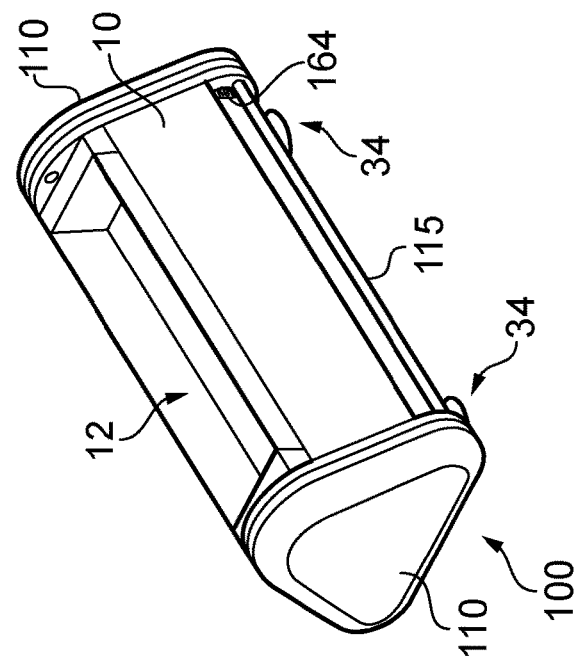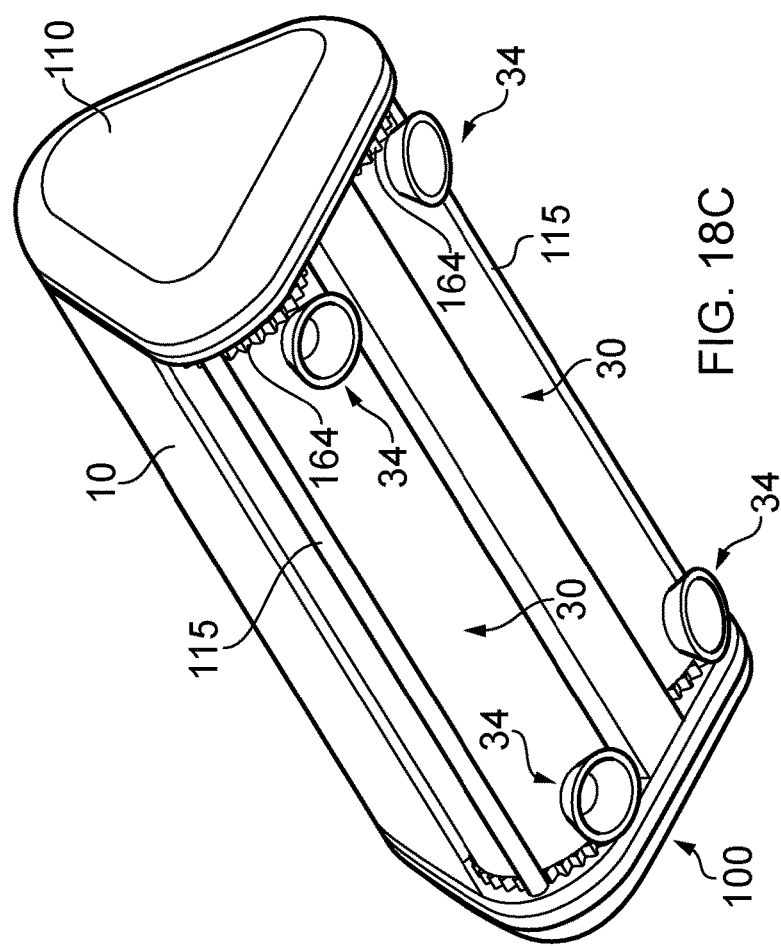

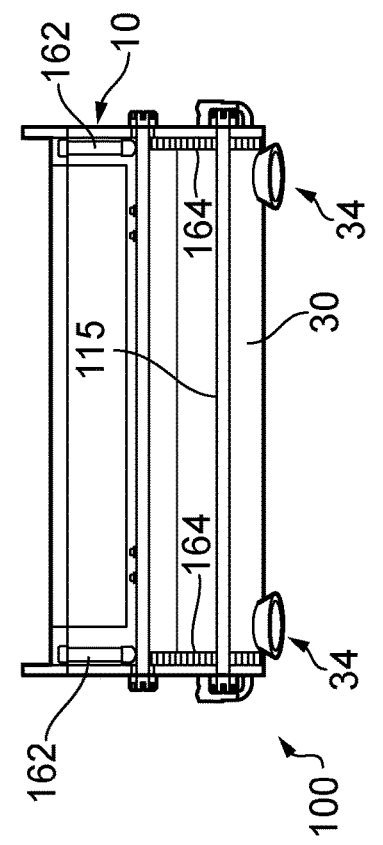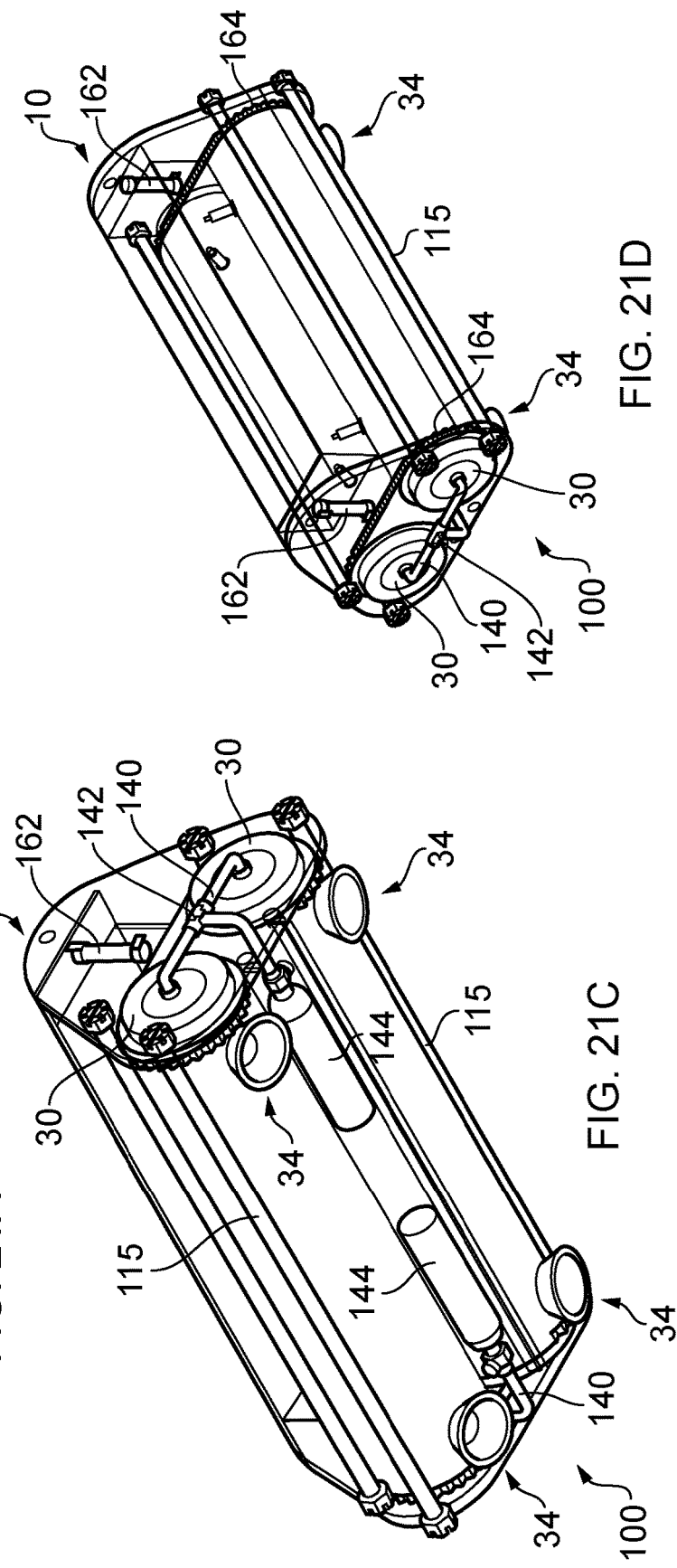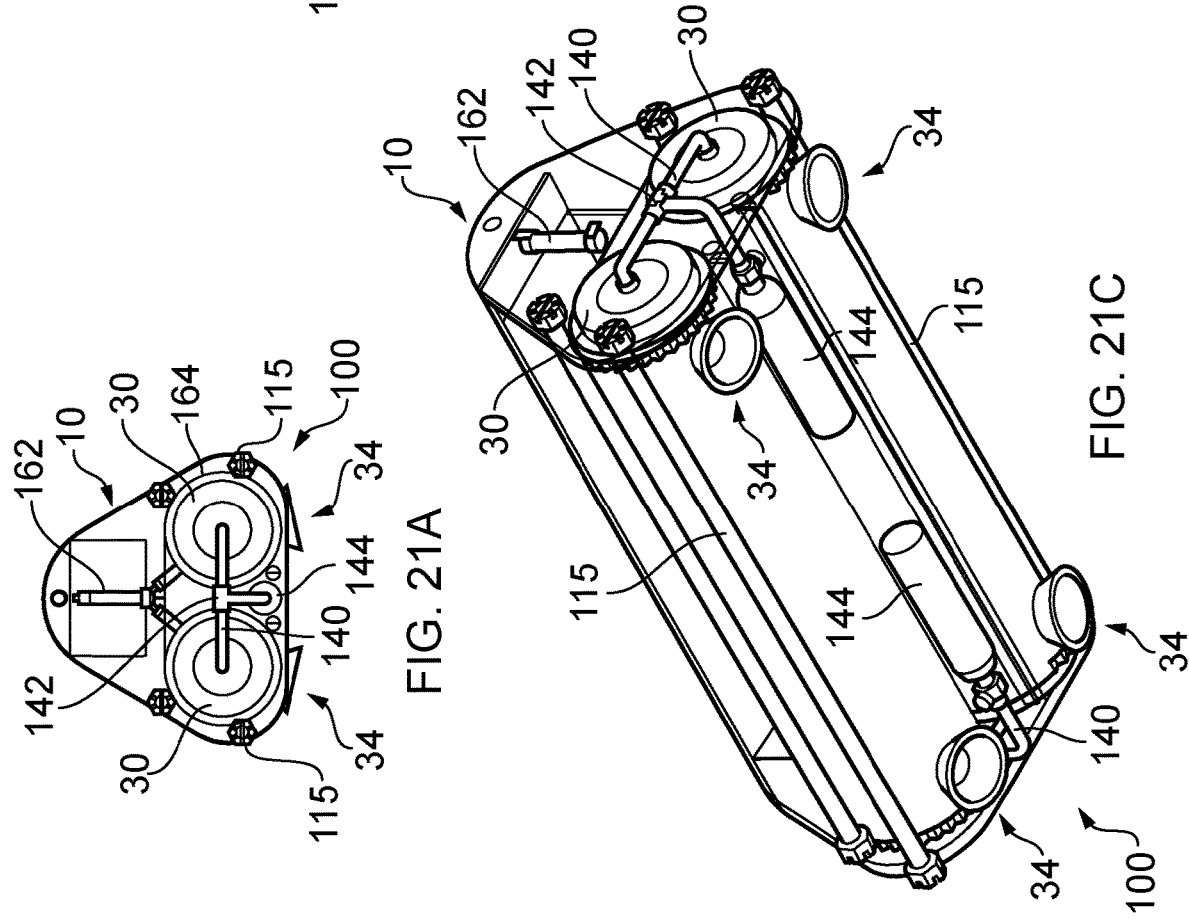

EMERGENCY LANDING APPARATUS DEPLOYMENT FOR EMERGENCY LANDING OF AIRCRAFT

CROSS-REFERENCE TO RELATED APPLICATIONS

This application is a national stage filing of International Application No. PCT/GB2018/053031, filed Oct. 19, 2018. The entire disclosure of the afore-mentioned patent application is incorporated herein by reference.

TECHNOLOGICAL FIELD

Embodiments of the present invention relate to emergency landing of aircraft.

BACKGROUND

It some circumstances it may become necessary for an aircraft to perform an emergency landing. For instance, damage to or failure of an aircraft's control system, a conventional aircraft's jet engine, an electric VTOL (eVTOL) aircraft's electric motor or a helicopter's rotor may result in a need to perform an emergency landing.

BRIEF SUMMARY

According to various, but not necessarily all, embodiments of the invention there is provided an emergency landing apparatus for an aircraft, the emergency landing apparatus comprising: a parachute; one or more rocket motors arranged to provide upwards thrust to control descent of the aircraft during emergency landing of the aircraft; and control circuitry configured to cause: deployment of the parachute to control descent of the aircraft during emergency landing of the aircraft; initiation of at least one of the one or more rocket motors to provide upwards thrust to control descent of the aircraft during emergency landing of the aircraft.

According to various, but not necessarily all, embodiments of the invention there is provided a method, comprising: deploying a parachute to control descent of an aircraft during emergency landing of the aircraft; and initiating at least one of the one or more rocket motors to provide upwards thrust to control descent of the aircraft during emergency landing of the aircraft.

According to various, but not necessarily all, embodiments of the invention there is provided an emergency landing apparatus for an aircraft, the emergency landing apparatus comprising: one or more rocket motors arranged to eject efflux in order to provide upwards thrust to control descent of the aircraft during emergency landing of the aircraft; and control circuitry configured to: cause the one or more rocket motors to eject efflux and provide upwards thrust to control descent of the aircraft during emergency landing of the aircraft; and cause redirection of the efflux ejected by the one or more rocket motors, during the emergency landing of the aircraft, in order to reduce the upwards thrust provided by the one or more rocket motors.

According to various, but not necessarily all, embodiments of the invention there is provided a method, comprising: causing one or more rocket motors of an aircraft to eject efflux and provide upwards thrust to control descent of the aircraft during emergency landing of the aircraft; and causing redirection of the efflux ejected by the one or more rocket motors, during the emergency landing of the aircraft, in order to reduce the upwards thrust provided by the one or more rocket motors.

According to various, but not necessarily all, embodiments of the invention there is provided an emergency landing apparatus for an aircraft, the emergency landing apparatus comprising: a housing for ejection from the aircraft; and a parachute, arranged for deployment from the housing, comprising a canopy and one or more inflatable airbags arranged to expand the canopy following deployment of the parachute from the housing.

According to various, but not necessarily all, embodiments of the invention there is provided a method, comprising: ejecting a housing comprising a parachute from an aircraft, the parachute comprising a canopy and one or more inflatable airbags; deploying a parachute from the housing, following ejection of the housing from the aircraft; and inflating one or more inflatable airbags to expand the canopy, following deployment of the parachute from the housing.

According to various, but not necessarily all, embodiments of the invention there is provided an emergency landing apparatus for an aircraft, the emergency landing apparatus comprising: a housing; and a parachute, arranged for deployment from the housing, comprising a canopy and one or more inflatable airbags arranged to expand the canopy following deployment of the parachute from the housing.

According to various, but not necessarily all, embodiments of the invention there is provided a parachute, comprising: a canopy; and one or more inflatable airbags arranged to expand the canopy following deployment of the parachute.

According to various, but not necessarily all, embodiments of the invention there is provided an emergency landing apparatus for an aircraft, the emergency landing apparatus comprising: a housing, for ejection from the aircraft, housing a steerable parachute having a canopy; and a steering mechanism, configured to steer the steerable parachute following deployment of the steerable parachute from the housing, coupled to the canopy by one or more steering lines.

According to various, but not necessarily all, embodiments of the invention there is provided an emergency landing apparatus for an aircraft, the emergency landing apparatus comprising: a parachute for coupling to the aircraft; and first and second rockets, coupled to the parachute, arranged to follow divergent trajectories following initiation in order to ballistically deploy the parachute.

According to various, but not necessarily all, embodiments of the invention there is provided an emergency landing apparatus for an aircraft, the emergency landing apparatus comprising: at least one receptacle comprising an internal chamber for storing a coolant; at least one rocket motor comprising a further internal chamber; at least one conduit coupling the internal chamber of the receptacle and the further internal chamber of the rocket motor; a valve, for controlling the passage of the coolant from the internal chamber of the receptacle to the further internal chamber of the rocket motor, configured to transition from a closed state to an open state in response to initiation of the rocket motor, wherein in the closed state the valve is configured to prevent the coolant from entering the internal chamber of the rocket motor and in the open state the valve is configured to enable the coolant to enter the internal chamber of the rocket motor.

According to various, but not necessarily all, embodiments of the invention there is provided an emergency landing apparatus for an aircraft, the emergency landing apparatus comprising: multiple altitude sensors, for sensing an altitude of the aircraft, arranged for distribution about a first, second and third axes, wherein the first axis is for positioning parallel to a normal axis of the aircraft, the second axis is for positioning parallel to a transverse axis of the aircraft and the third axis is for positioning about a longitudinal axis of the aircraft; one or more rocket motors arranged to eject efflux in order to provide upwards thrust to control descent of the aircraft during emergency landing of the aircraft; and control circuitry configured to determine when to initiate the one or more rocket motors to provide the upwards thrust, at least in part based on one or more inputs from the multiple altitude sensors.

According to various, but not necessarily all, embodiments of the invention there is provided an emergency landing apparatus for an aircraft, the emergency landing apparatus comprising: one or more rocket motors, comprising solid combustible propellant, arranged to eject efflux in order to provide upwards thrust to control descent of the aircraft during emergency landing of the aircraft; one or more sensors for sensing an altitude of the aircraft; and control circuitry configured to determine when to initiate the one or more rocket motors, based at least in part on a descent rate of the aircraft, an altitude of the aircraft and a current weight of the aircraft.

According to various, but not necessarily all, embodiments of the invention there is provided examples as claimed in the appended claims.

BRIEF DESCRIPTION

For a better understanding of various examples that are useful for understanding the detailed description, reference will now be made by way of example only to the accompanying drawings in which:

FIGS. 18A, 18B, 18C and 18D illustrate an end view, a side view, an underside perspective view and an elevated perspective view of another embodiment of the emergency landing apparatus;

Figure 19B:
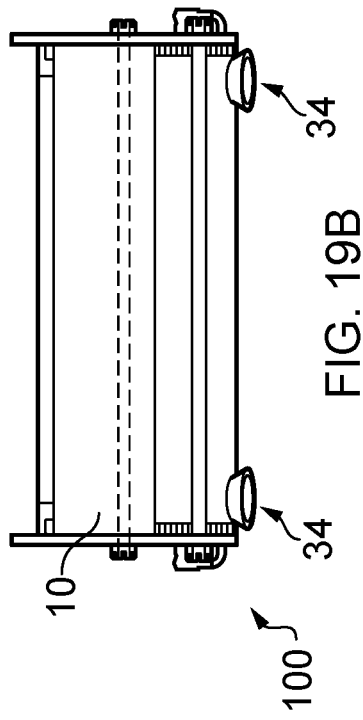
FIGS. 19A, 19B, 19C and 19D illustrate an end view, a side view, an underside perspective view and an elevated perspective view of the emergency landing apparatus shown in FIGS. 18A to 18D, where the end caps have been removed.
Figure 19D:
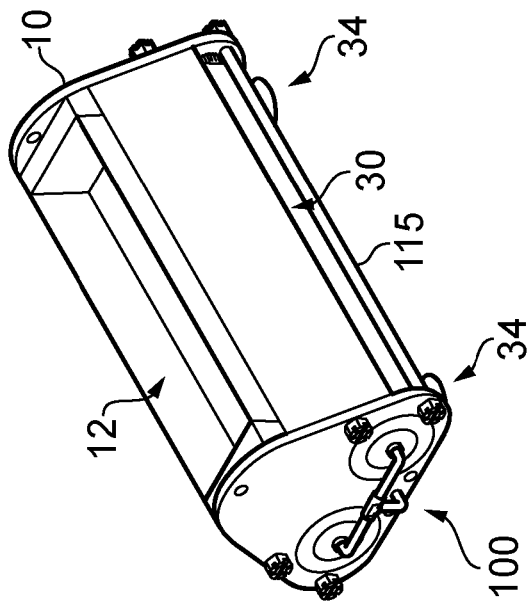
Figure 19A:
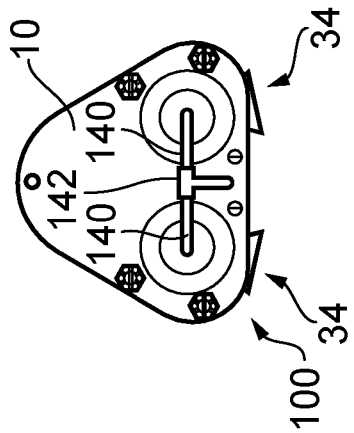
Figure 19C:
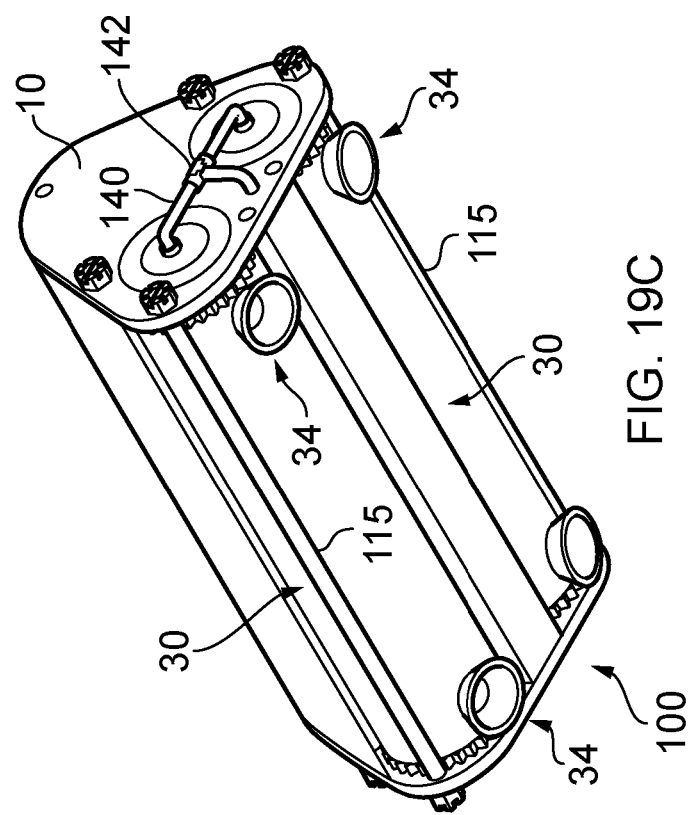
Figure 20:
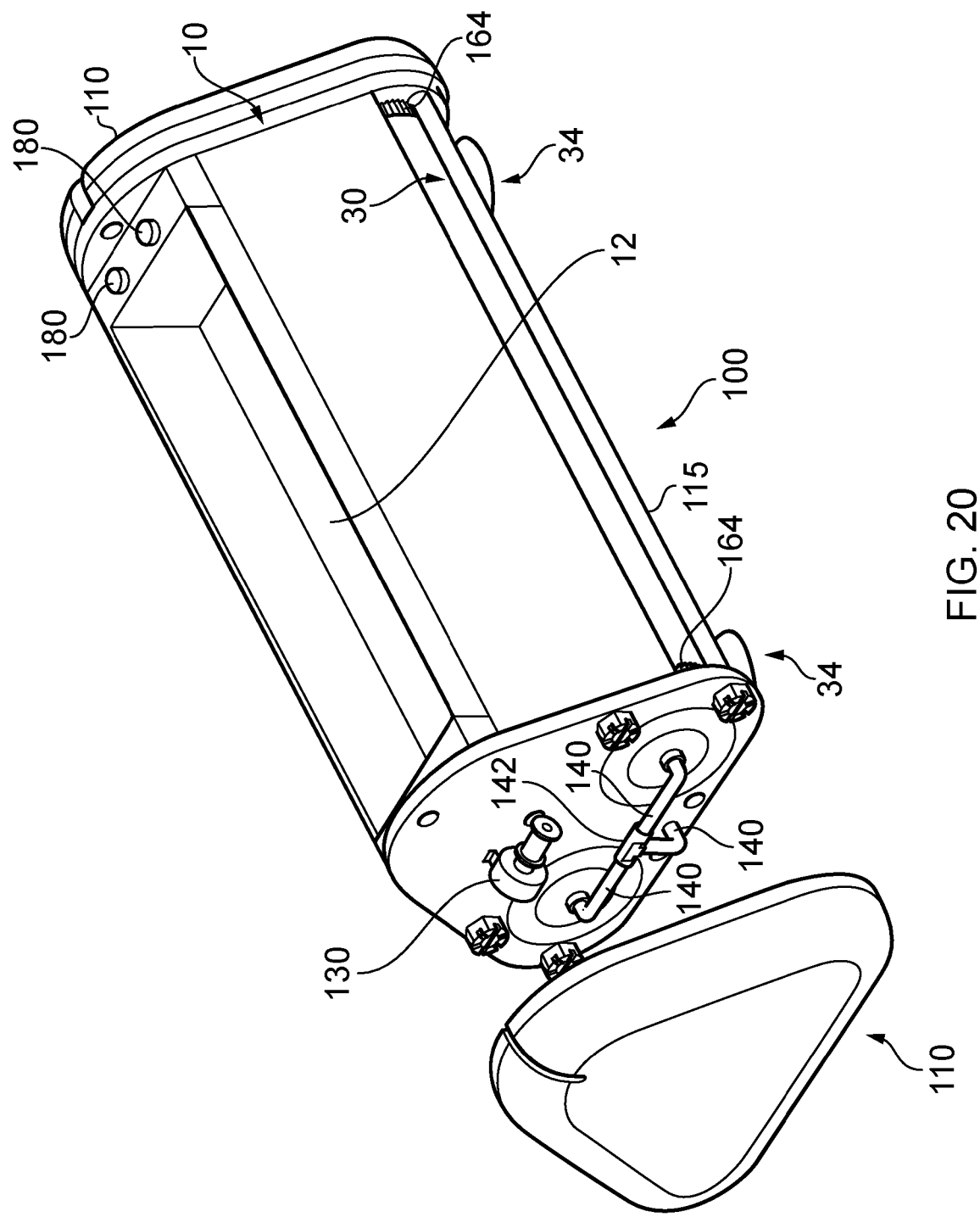
Figure 23:
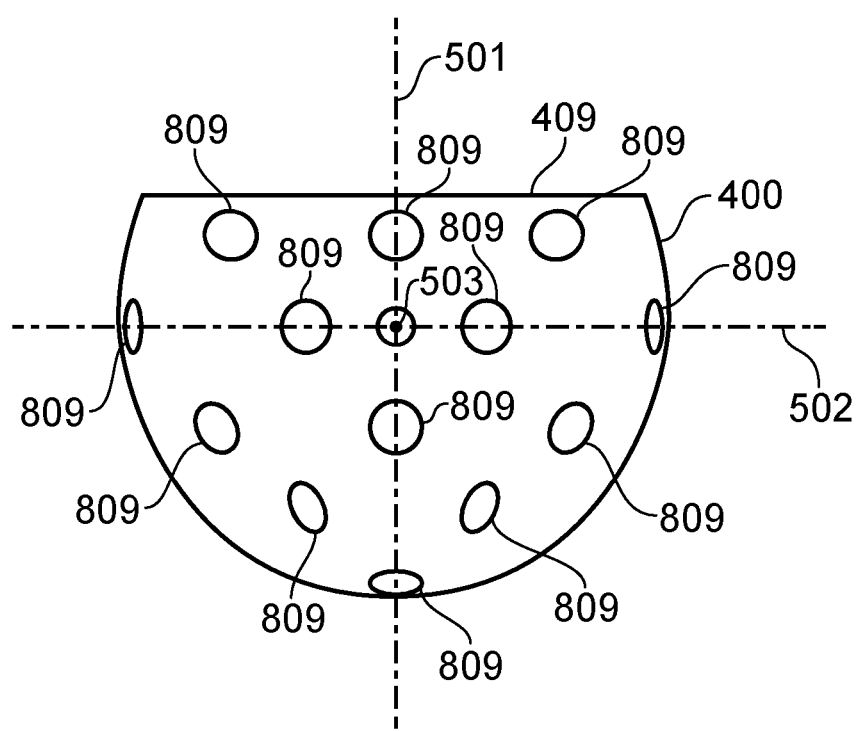
Figure 24:
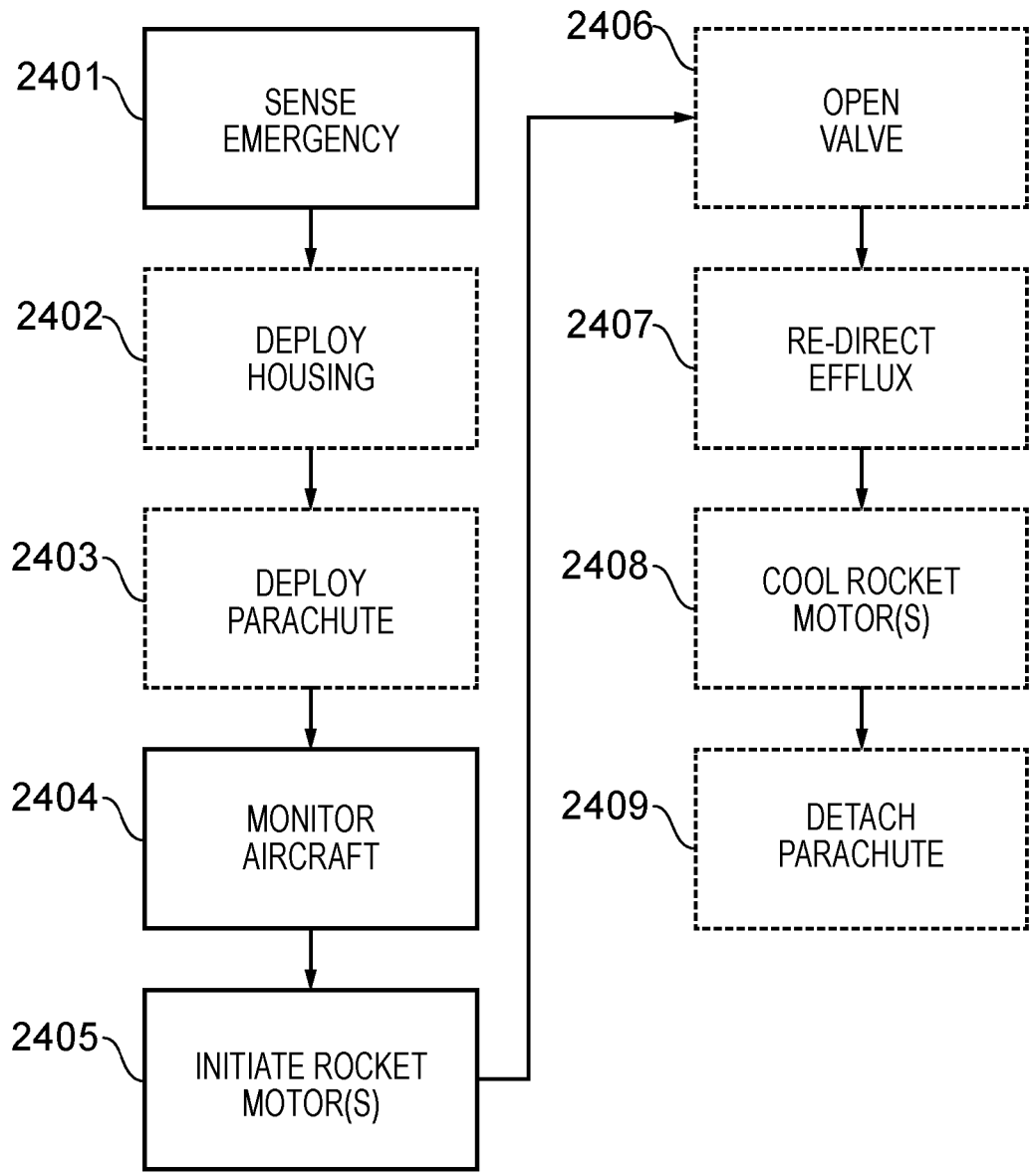

FIG. 20 includes a larger version of FIG. 19C, with the end cap also shown;

FIGS. 21A, 22B, 22C and 22D illustrate an end view, a side view, an underside perspective view and an elevated perspective view of the emergency landing apparatus shown in FIGS. 18A to 18D, where portions of the outer housing are transparent to shown the interior of the apparatus;

FIGS. 22A to 22D illustrate the emergency landing apparatus of FIGS. 18A to 22D and its parachute being deployed;

FIG. 23 illustrates altitude sensors for sensing the altitude of an aircraft; and FIG. 24 illustrates a flow chart of a third method.

DETAILED DESCRIPTION

In future, it is expected that aircraft, such as VTOL aircraft, will be used increasingly to transport cargo and people. For example, VTOL aircraft may be used to transport individual parcels or to carry a person (or a small number of people) from one destination to another on a regular basis.

There may be circumstances in which the aircraft is damaged or fails, resulting in a need to perform an emergency landing.

Embodiments of the invention relate to an emergency landing apparatus that enables an aircraft to perform an emergency landing. The emergency landing apparatus is particularly suitable for a VTOL aircraft, but may also be suitable for other types of aircraft.

Figure 1:
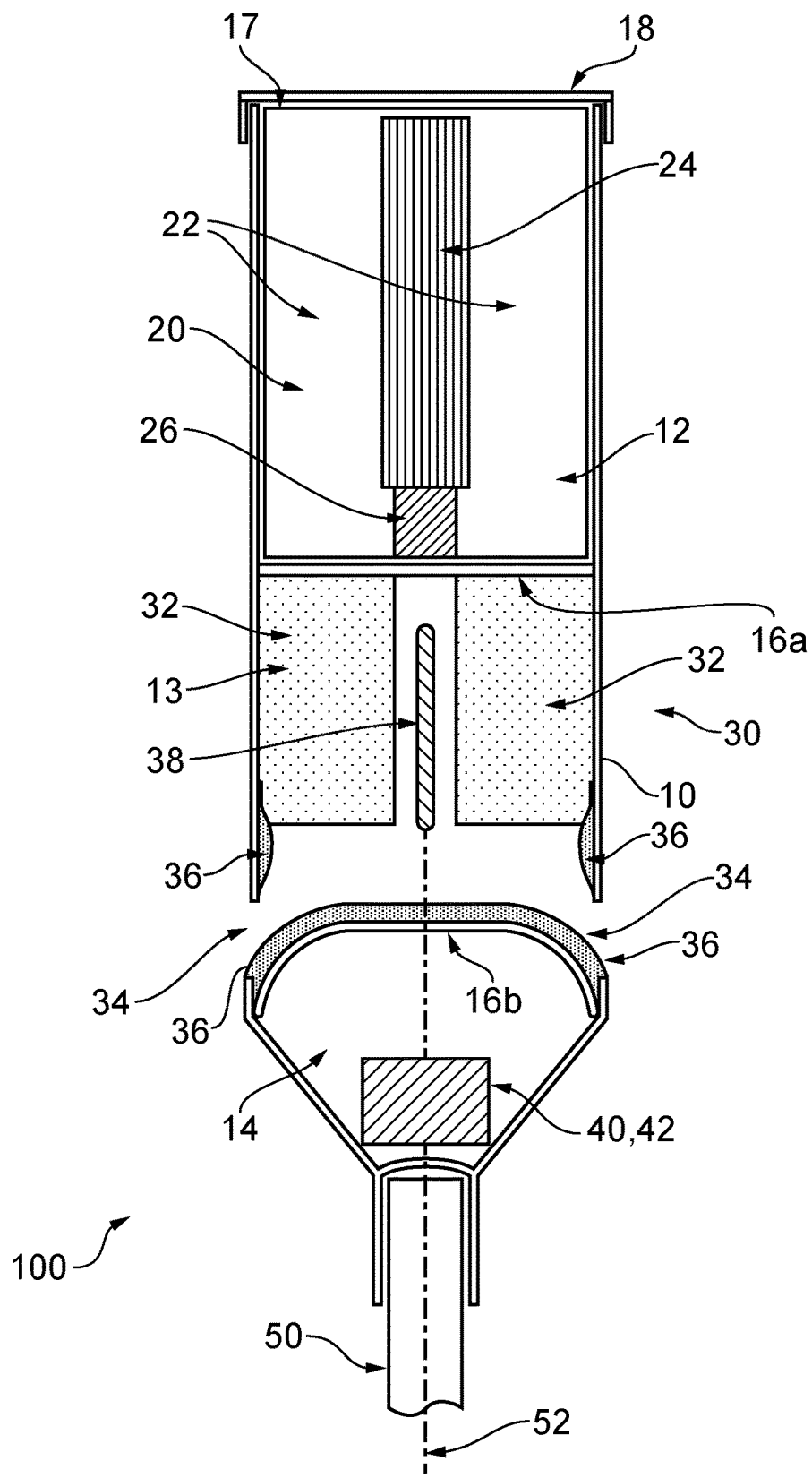
FIG. 1 illustrates an embodiment of an emergency landing apparatus for an aircraft.
Figure 2:
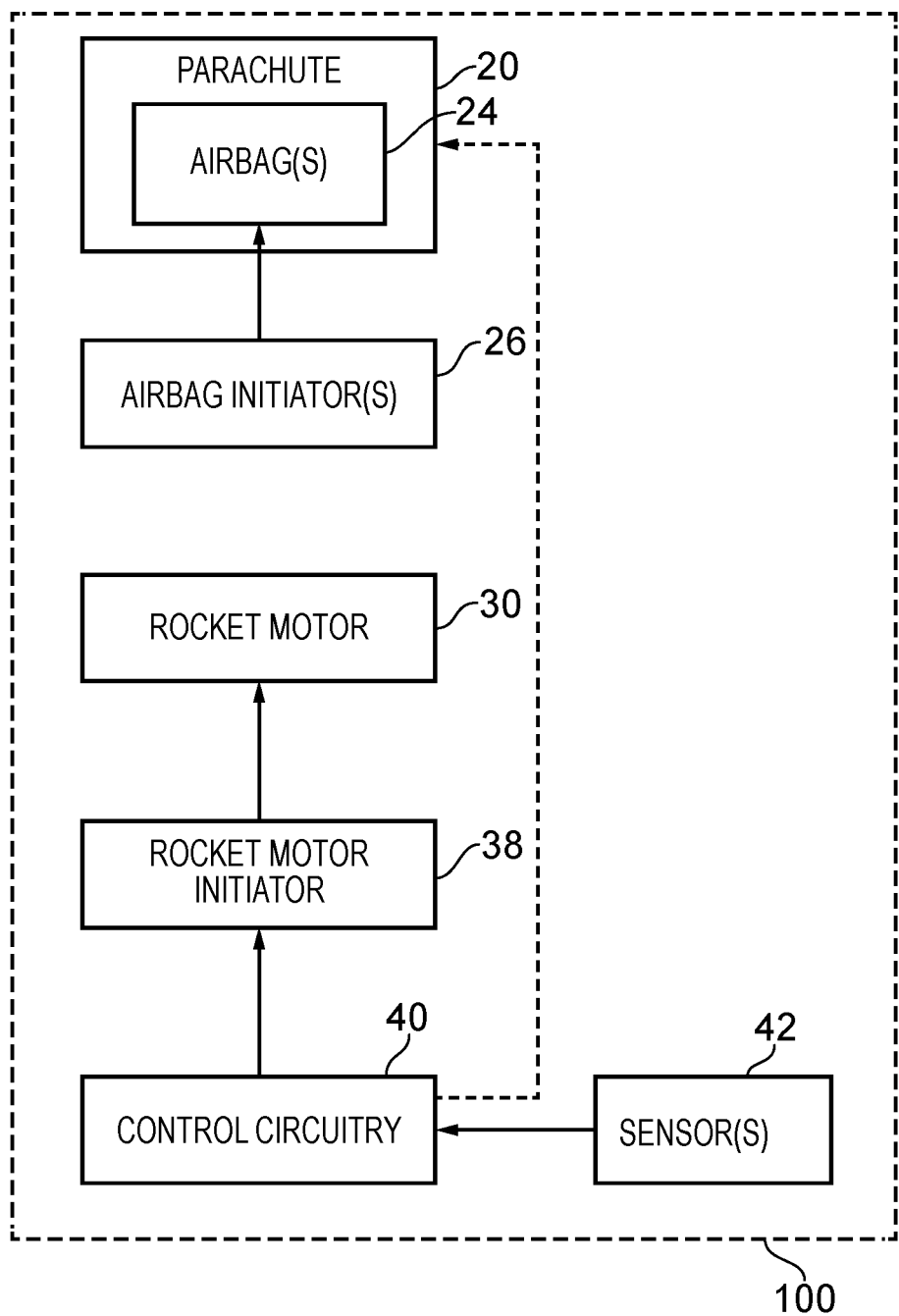
FIG. 2 illustrates a schematic of some parts of the emergency landing apparatus.

FIG. 1 illustrates an embodiment of the emergency landing apparatus 100. FIG. 2 illustrates a functional schematic of some parts of the emergency landing apparatus 100. In the example illustrated in FIG. 1, the emergency landing apparatus 100 comprises a housing 10 and a parachute 20 comprising a canopy 22 and one or more inflatable airbags 24.

The housing 10 is ejected/deployed from an aircraft when emergency landing of the aircraft is required. This is described in further detail below. References are made below to the actively launching/ejecting the housing 10 from the aircraft. While in implementations the housing 10 can be deployed in this manner, in others it may instead be passively deployed using the effects of gravity (that is, not actively launched/ejected from the aircraft). This applies to all of the forms of the housing 10 that are described and illustrated herein.

The parachute 20 is arranged for deployment from the housing 10. The airbag(s) 24 are arranged to expand the canopy 22 following deployment of the parachute 20 from the housing 10. As the airbags 24 inflate, they cause the canopy 22 to expand much more rapidly than would otherwise be the case.

In practice, it is likely that multiple inflatable airbags 24 will be provided, but in some implementations, there could merely be a single one.

In the illustrated embodiment, the emergency landing apparatus 100 further comprises a rocket motor 30, but this need not be the case in every embodiment.

The housing 10 may take the form of a canister, which might, for example, be largely cylindrical in shape. The housing 10 comprises a first (upper) compartment 12, a second (middle) compartment 13 and a third (lower) compartment 14. The first compartment 12 is separated from the second compartment 13 by at least one wall 16a. The second compartment 13 is separated from the third compartment 14 by at least one wall 16b. In the illustrated embodiment, the second compartment 13 is positioned between the first compartment 12 and the third compartment 14.

The parachute 20 is stored in the first compartment 12. The first compartment 12 has an aperture 17 that is covered by a cover 18. The cover 18 may be removable and/or frangible. The aperture 17 is shaped to enable the parachute 20 to be deployed from the housing 10. Deployment of the parachute 20 from the housing 10 involves the canopy 22 and the inflatable airbags 24 exiting the housing 10 via the aperture 17.

Each of the inflatable airbags 24 comprises either a compressed gas such as carbon dioxide or nitrogen, or a gas generation formulation such as sodium azide, that is ignited to cause the airbag to inflate. Inflation of the airbags 24 does not occur until after the housing 10 has been ejected from an aircraft and the parachute 20 has been deployed from the housing 10.

Means, in the form of one or more airbag initiator(s) 26, is provided which initiates airbag inflation by causing release of the compressed gas or the gas generation formulation. The airbag initiator(s) 26 may take different forms. In some embodiments, the airbag initiator(s) 26 may comprise control circuitry which causes ignition of the gas generation formulation and means, in the form of one or more sensors, for sensing movement of the parachute 20/airbags 24 out of the housing 10. Such means/sensors may provide inputs to the control circuitry which causes the control circuitry to inflate of the airbags 24 after the parachute 20 has exited the housing 10. The one or more sensors may include one or more inertial sensors. A power source is provided, if required, to power the control circuitry and possibly also the sensor(s). This power source is independent of and in addition to the power source(s) powering the aircraft in which the emergency landing apparatus 100 may be stored. If a compressed gas is used to inflate the airbag(s) 24, the control circuitry may cause a valve to open or a disc to burst to rapidly release the compressed gas.

In other embodiments, the means for sensing movement of the parachute 20 out of the housing 10 and the means for initiating airbag inflation may be different from that described above. They might be mechanical in nature rather than electronic. For example, one or more lanyards may be anchored to the housing 10 (directly or indirectly via connection to another component in the housing 10) and releasably coupled to the airbags 24. Movement of the parachute 20 may unravel the lanyard(s), eventually creating tension in the lanyard(s) when the parachute 20 has exited the housing 10. The tension in the lanyard(s) causes the coupling between the airbags 24 and the lanyard(s) to be released, which in turn causes control circuitry to ignite the explosive. In some implementations, use of control circuitry might be unnecessary. For example, release of the lanyard(s) might remove an insulative material and removal of that insulative material (e.g. from between two sprung-loaded electrical contacts) may then complete an electrical circuit and cause ignition of the explosive material. Alternatively, pulling each lanyard may trigger a simple percussion cap initiator. An advantage of this type of implementation is that a power source is not necessarily required to ignite the explosive and inflate an airbag 24.

Alternatively, the airbags may be pressurized from small cylinders containing compressed gas such as carbon dioxide, and the lanyard(s) may operate a valve, break a bursting disc or operate another device to rapidly release the compressed gas.

The rocket motor 30 is positioned in the second compartment 13 of the housing 10 and is arranged to provide upwards thrust (i.e. thrust having an upwards component) to control descent of the aircraft during emergency landing of an aircraft. The rocket motor 30 comprises propellant 32 which might, for example, be cast propellant. The rocket motor 30 includes one or more exit nozzles 34 through which gas generated by the burning propellant 32 is ejected in order to provide the upwards thrust. The exit nozzles 34 may each include a protective lining 36. The exit nozzles 24 in the illustrated embodiment are angled (in use, relative to the vertical and the horizontal) and may be arranged such that no net horizontal thrust is generated by the rocket motor 30 in use. It might be, for example, that the effect of the horizontal thrust that is generated in one direction by the exit nozzle(s) 34 is counteracted by horizontal thrust that is generated in the opposite direction by the exit nozzle(s) 34, resulting in generation of thrust without a net horizontal component.

A rocket motor initiator 38 is provided to initiate the rocket motor 30 to provide thrust (i.e. to ignite the propellant, causing thrust to be provided). In the illustrated example, the propellant 32 and the rocket motor initiator 38 are positioned above the exit nozzle(s) 34. The rocket motor initiator 38 is controlled by control circuitry 40, which receives and processes inputs from one more sensors/sensor circuitry 42 to decide whether or not to ignite the rocket motor(s) 30. The sensor(s) 42 might, for example, include an altimeter (such as a laser altimeter or a radio altimeter). The control circuitry 40 and/or the sensors 42 might be positioned in the housing 10, such as in the third compartment 14.

A power source may be provided to power the control circuitry 40 and the sensors 42. This power source might or might not be the same as any power source that is provided to cause inflation of the airbags. The power source that is provided to power the control circuitry 40 and the sensors 42 may be independent of and in addition to the power source(s) powering the aircraft in which the emergency landing apparatus 100 may be stored.

Means, such as one or more sensors, may be provided for sensing whether the housing 10 has been ejected from the aircraft. The sensing of such ejection may cause subsequent arming of the airbag initiators. For example, the means/sensor(s) may include one or more inertial sensor(s) which cause the airbag initiator(s) 26 and/or the rocket motor 30 to switch from a "safe mode" to an "operative mode" in response to ejection of the housing 10 from the aircraft. Alternatively or additionally, the means/sensor(s) may include a microswitch (for instance, at least partially positioned on the outer surface of housing 10) which senses ejection of the housing 10. Alternatively or additionally, the means/sensor(s) may include an inertial sensor in the apparatus 100 that is coupled to a lanyard which, in turn, is also coupled to the aircraft. The length of the lanyard might be such that tension in the lanyard activates the inertial switch as the housing 10 leaves the aircraft upon ejection.

In embodiments where a power source is used to provide power to the airbag initiator(s) 26, the power source may be enabled to provide power only when ejection of the housing 10 from the aircraft has been sensed. The power source for powering the rocket motor initiator 38, rocket motor control circuitry 40 and/or sensors 42 might only be enabled to provide power to one, some or all of the components only when ejection of the housing 10 from the aircraft has been sensed.

A tether 50 may couple the housing 10 to aircraft following ejection of the housing 10 from the aircraft. The tether 50 could be 10 meters long in some embodiments, but in other embodiments it could be longer or shorter. The tether 50 might be the lanyard that activates the inertial switch to transition the airbag initiator(s) 26 and/or the rocket motor 30 from a "safe mode" to an "operative mode" in the manner described above.

The housing 10 remains tethered to the aircraft by the tether 50 after the parachute has been deployed. The tether 50 might include an electrical connection 52 to the aircraft (such as the aircraft control system). This may enable the aircraft control system to provide sensor inputs and/or control signals to the apparatus 100. Such sensor inputs and control signals may cause deployment of the parachute 20 and/or initiation of the rocket motor 30. The tether 50 may be attached to the housing 10 via a reel which unravels when the housing 10 is ejected from the aircraft. The reel might be positioned in the aircraft, positioned on the outside of the housing 10, or positioned on the inside of the housing 10, such as within the third compartment 14.

Figure 3:
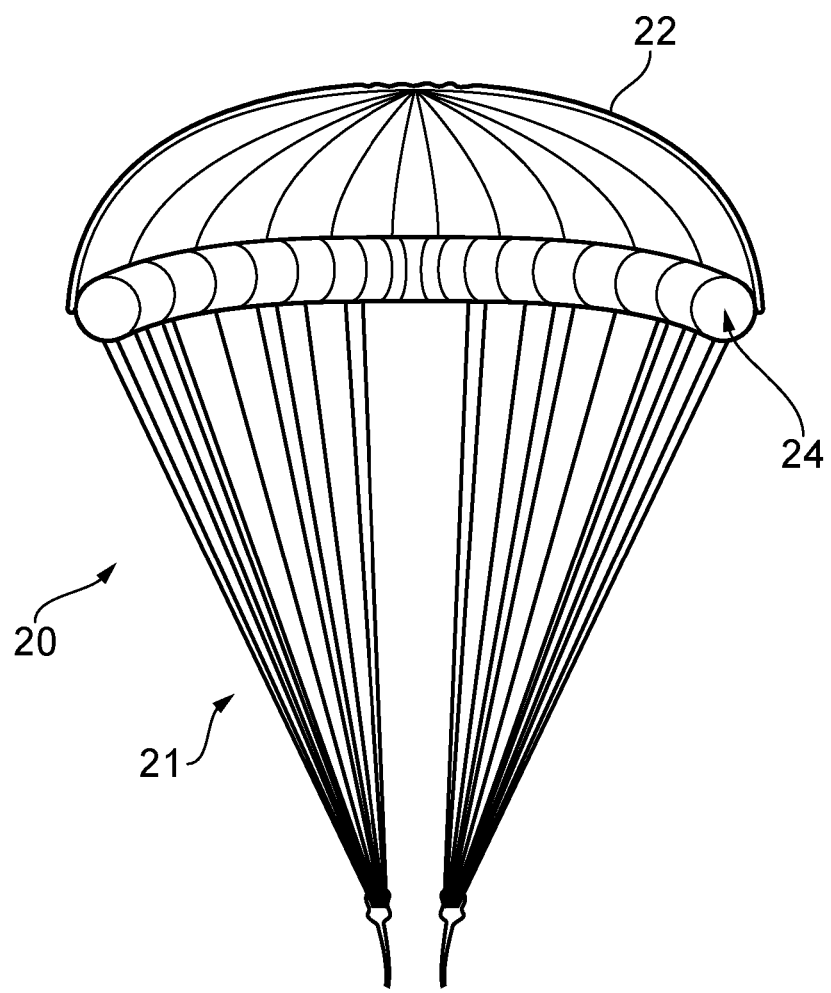
FIG. 3 illustrates a cross-section of a parachute that may form part of the emergency landing apparatus.

FIG. 3 illustrates a cross-section of an example of the parachute 20 after it has been deployed. One or more tethers 21 couple the parachute 20 to the housing 10 following ejection of the housing 10 and deployment of the parachute 20.

The inflatable airbags 24 might be positioned on the inside of the canopy 22 to cause it to expand/open upon inflation of the airbags. In the illustrated example the inflatable airbags 24 are positioned along an inner periphery of the canopy 22, but that need not be in the case in every example. In a different example, the inflatable airbags 24 might be positioned on the outside of the canopy 22, such as along an outer periphery of the canopy 22.

Figure 4A:
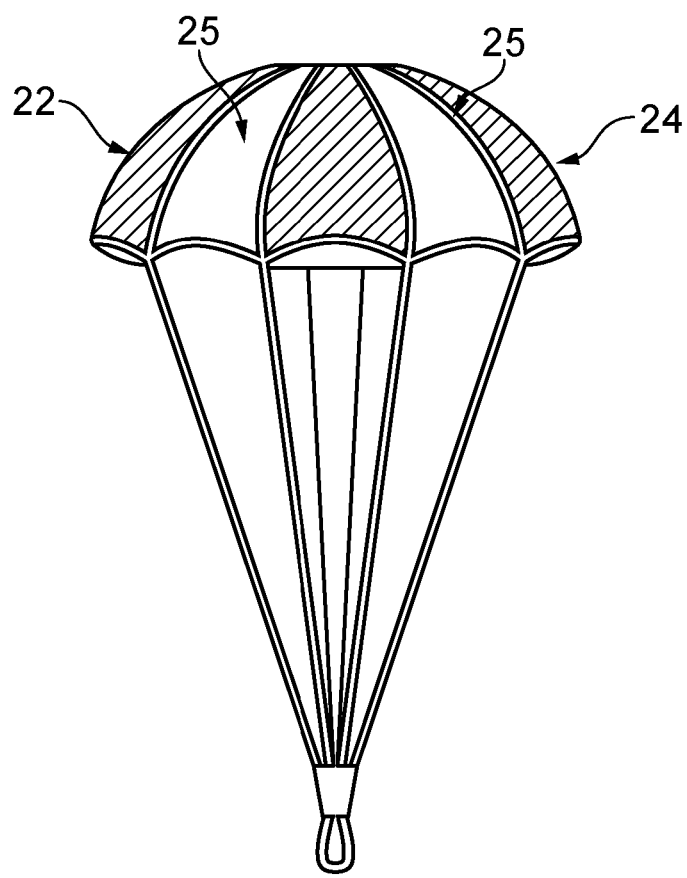
FIGS. 4A and 4B illustrate an alternative embodiment of the parachute.
Figure 4B:
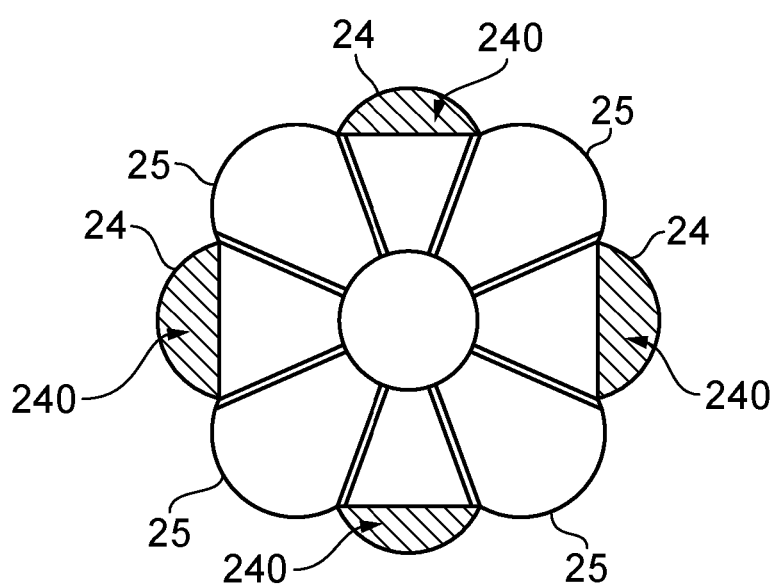

FIGS. 4A and 4B illustrate a different embodiment of the parachute 20 in which the inflatable airbags 24 extend downwards from a center point of the canopy 22. FIG. 4A illustrates a side elevation of the parachute and FIG. 4B illustrates a view of the underside of the canopy 22.

In the embodiment illustrated in FIGS. 4A and 4B, each set of adjacent inflatable airbags 24 is interconnected by a non-inflatable gore 25. The shading in FIG. 4A illustrates exterior surfaces of the inflatable airbags 24. The shading in FIG. 4B illustrates a volume 240 in each inflatable airbag that has been created by the inflation of the airbags 24.

The parachutes 20 shown in FIGS. 3, 4A and 4B are round parachutes, but that need not be the case in every example.

Figure 5:
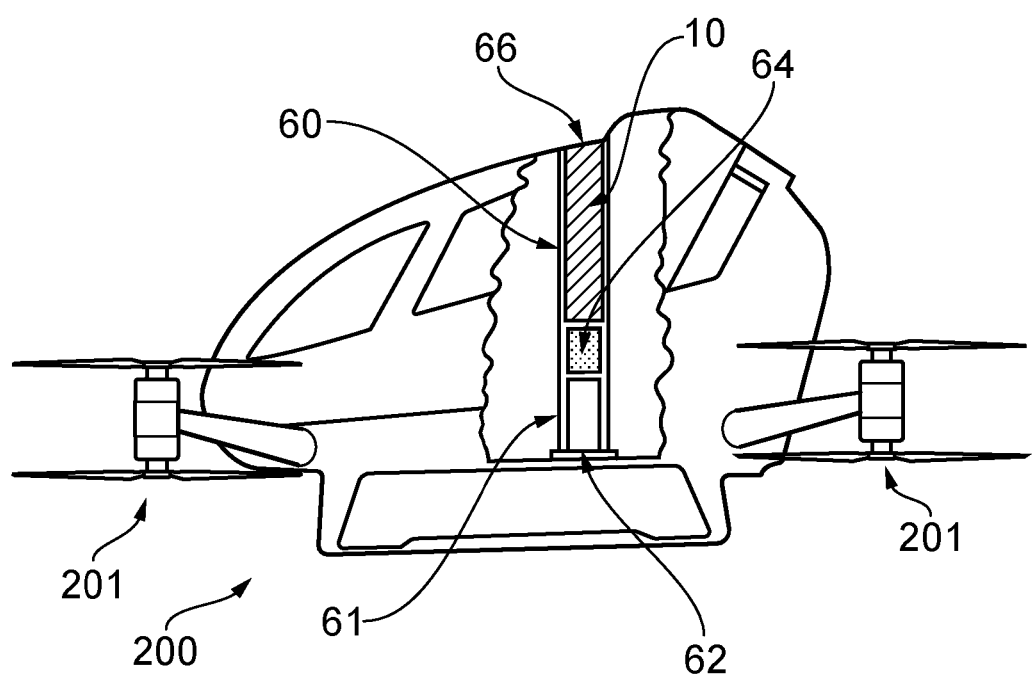
FIG. 5 illustrates an aircraft comprising the emergency landing apparatus.

FIG. 5 illustrates an aircraft 200 that comprises the emergency landing apparatus 100. In this example, the aircraft 200 is an eVTOL aircraft comprising one or more electrical motors for powering multiple rotors 201. In other embodiments, the engine(s) for powering the aircraft 200 might be different from electrical motors. The engine(s) could include one or more combustion engines or one or more jet engines, for example.

The aircraft 200 comprises a launcher/means 60 for storing and ejecting the housing 10 from the aircraft 200. A cover 66 may be provided which protects the housing 10 and its contents during storage. The cover 66 may be frangible and/or removable.

The launcher 60 may comprise an explosive for ejecting the housing 10 from the aircraft. Alternatively, the launcher 60 comprise a non-combustible propellant such as a pressurized gas contained in a container with a frangible surface that, when broken, releases the gas to generate thrust. The explosive/pressurized gas is indicated by reference numeral 64 in FIG. 5.

Forces are exerted on the aircraft 200 when the housing 10 is ejected and, following ejection, from the drag generated by the parachute 20 and the thrust generated by the rocket motor 30. The launcher 60 comprises a support structure 61 that effectively transfers those forces through the aircraft 200 in a manner that does not compromise the integrity of the aircraft 200. A load spreading structure 62 may be provided that couples the support structure 61 to the base of the aircraft 200 to disperse the forces across the base.

Figure 6:
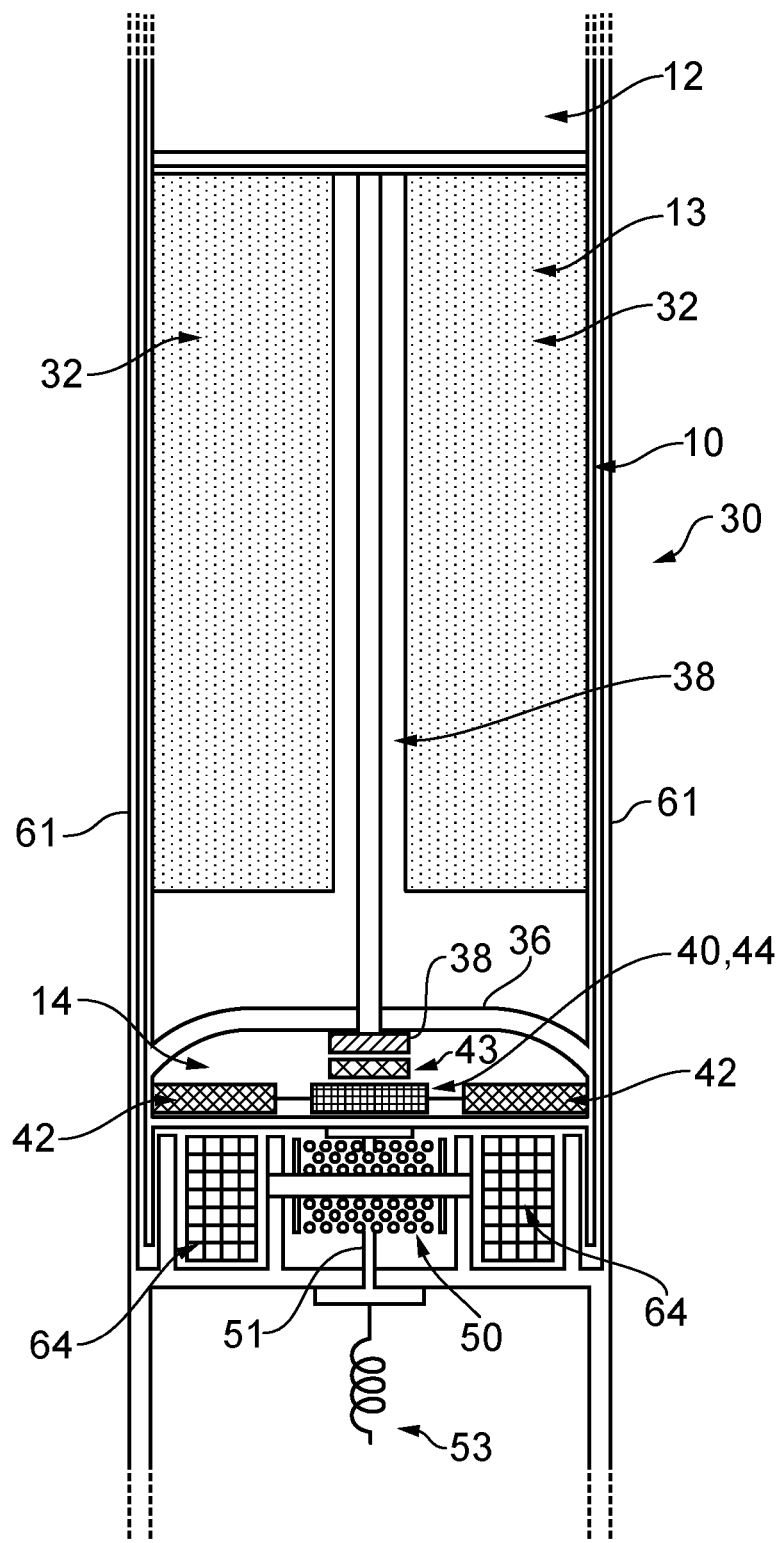
FIG. 6 illustrates a cross section of a compartment of a housing of the emergency landing apparatus which comprises a rocket motor.

FIG. 6 illustrates an embodiment of the emergency landing apparatus 100 in which the housing 10 is positioned inside the support structure 61 of the launcher 60. A cross section of the second and third compartment 13, 14 of the housing 10 are shown.

The reference numeral 43 indicates one or more sensors, such as an inertial sensor, which may be used to transition the rocket motor 30 (and possibly also the airbag initiators 26) from a safe mode to an operative mode. The sensor(s) provide inputs to control circuitry 40 which effects the mode transition.

FIG. 6 also illustrates the sensor(s) 42, such as an altimeter, which provide inputs to the control circuitry 40 (following ejection of the housing 10) to enable it to decide whether to activate the rocket motor 30 to provide upwards thrust.

The explosive/non-combustible propellant 64 that is used to eject the housing 10 is illustrated in FIG. 6. FIG. 6 further illustrates the reel 51 mentioned above (which, in this embodiment forms part of the launcher 60 rather than the housing 10) and the tether 50 which couples the housing 10 to the aircraft 200. An electrical connection 53 is illustrated which electrically connects the apparatus 100 (e.g. the control circuitry 40 of the apparatus 100) to the electrical power supply and possibly the control circuitry 70 of the aircraft 200 (see FIG. 7).

Figure 7:
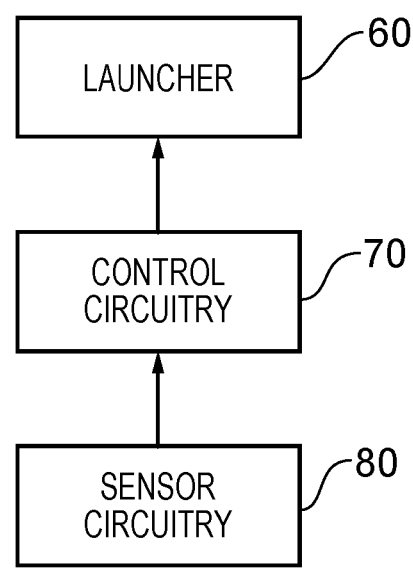
FIG. 7 illustrates a schematic of some parts of the aircraft.

FIG. 7 illustrates some aspects of the aircraft control system. The aircraft 200 comprises sensor circuitry 80 comprising one or more sensors and control circuitry 70. The sensor circuitry 80 is configured to sense failure of the aircraft 200 and/or damage to the aircraft 200 that might be indicative of an emergency. The sensor circuitry 80 might, for example, include one or more sensors for sensing engine failure and/or an altimeter for sensing descent of the aircraft 200. Alternatively or additionally, the sensor circuitry 80 might include user input circuitry that enables a user to provide one or more inputs to indicate that an emergency has occurred which requires an emergency landing to be performed.

The control circuitry 70 monitors and processes inputs from the sensor circuitry 80. In the event that the control circuitry 70 determines that the sensor inputs are indicative of an emergency situation that is causing or will cause an uncontrolled descent of the aircraft (e.g. to ground or sea), the control circuitry 70 controls the launcher 60 to eject the housing 10 of the emergency landing apparatus 100. This is described in more detail in relation to FIGS. 8 to 9B below.

Sensor inputs that may be indicative of an emergency situation might include sensing of a descent rate of the aircraft that exceeds a predetermined threshold (e.g. using the altimeter) and/or sensing failure of (at least an aspect of) one or more engines of the aircraft 200 that is preventing the aircraft 200 from generating sufficient upward thrust to remain airborne (or will do so in the near future). Alternatively, sensing of an excessively rapid change in aircraft attitude such as roll, pitch or yaw (e.g. sensing a rate of change that exceeds a threshold value) may cause the control circuitry 70 control the launcher 60 to eject the housing 10.

The launcher 60 might be powered by a power source that is independent of and in addition to the power source(s) powering the aircraft 200. That power source may be controlled by the control circuitry 70. For instance, as a safety measure, the control circuitry 70 might (only) switch on the power source when the aircraft 200 is powered up for flight. The power source continues to provide power for a period of time after the aircraft is powered down, so that it can provide the necessary power to eject the housing 10 after failure of the aircraft (e.g. failure of the aircraft control system and/or the main aircraft power supply).

Figure 8:
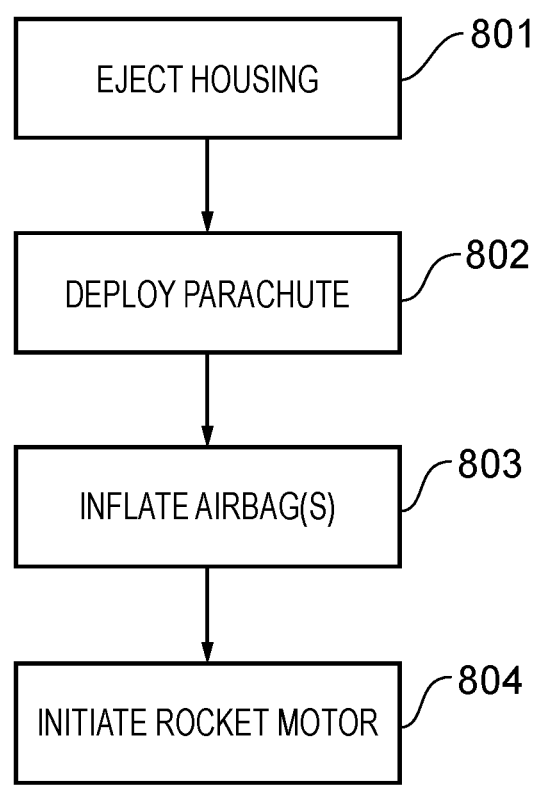
FIG. 8 illustrates a flow chart of a first method.
Figure 9A:
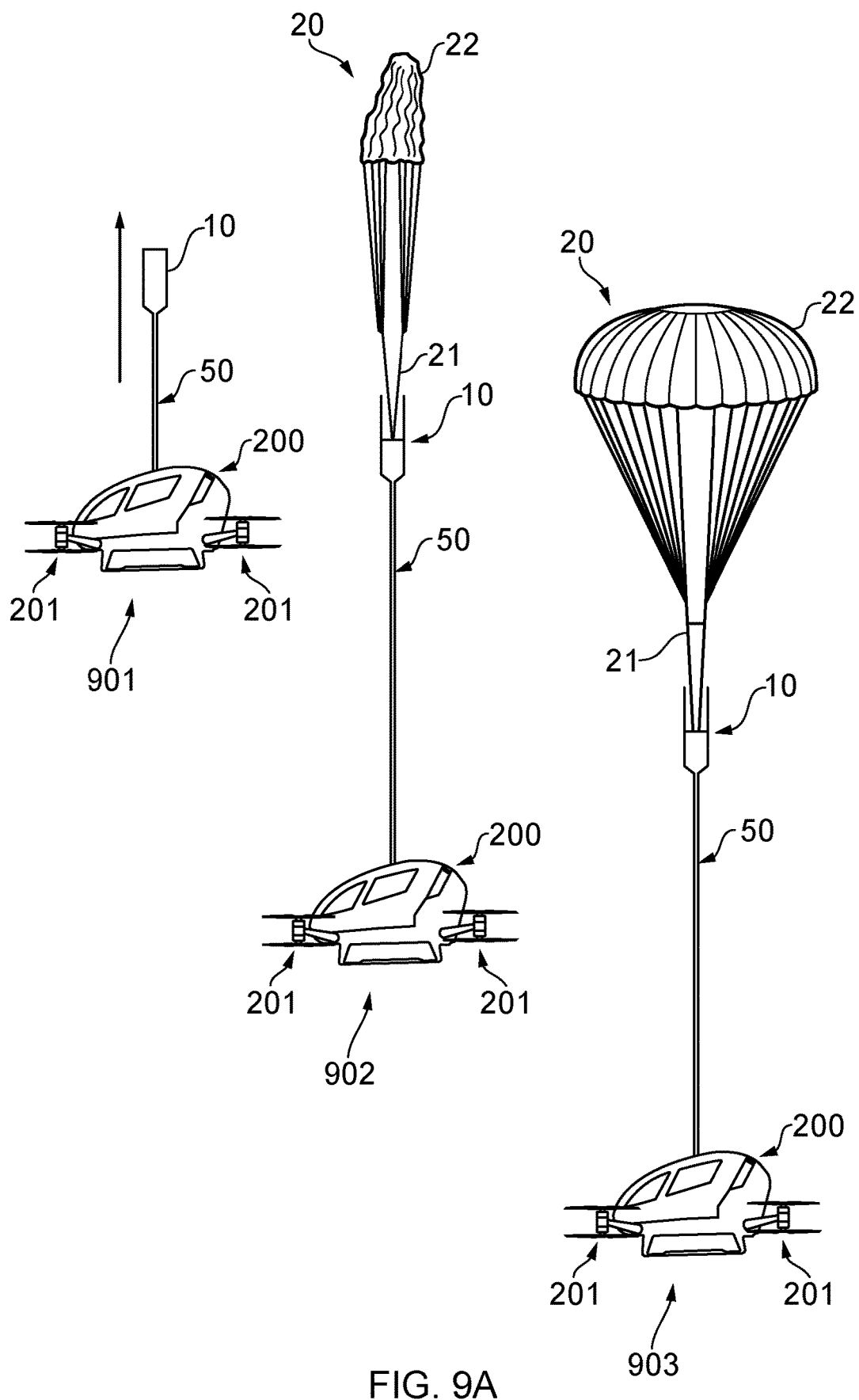
FIGS. 9A and 9B illustrate an aircraft performing an emergency landing using the emergency landing apparatus.
Figure 9B:
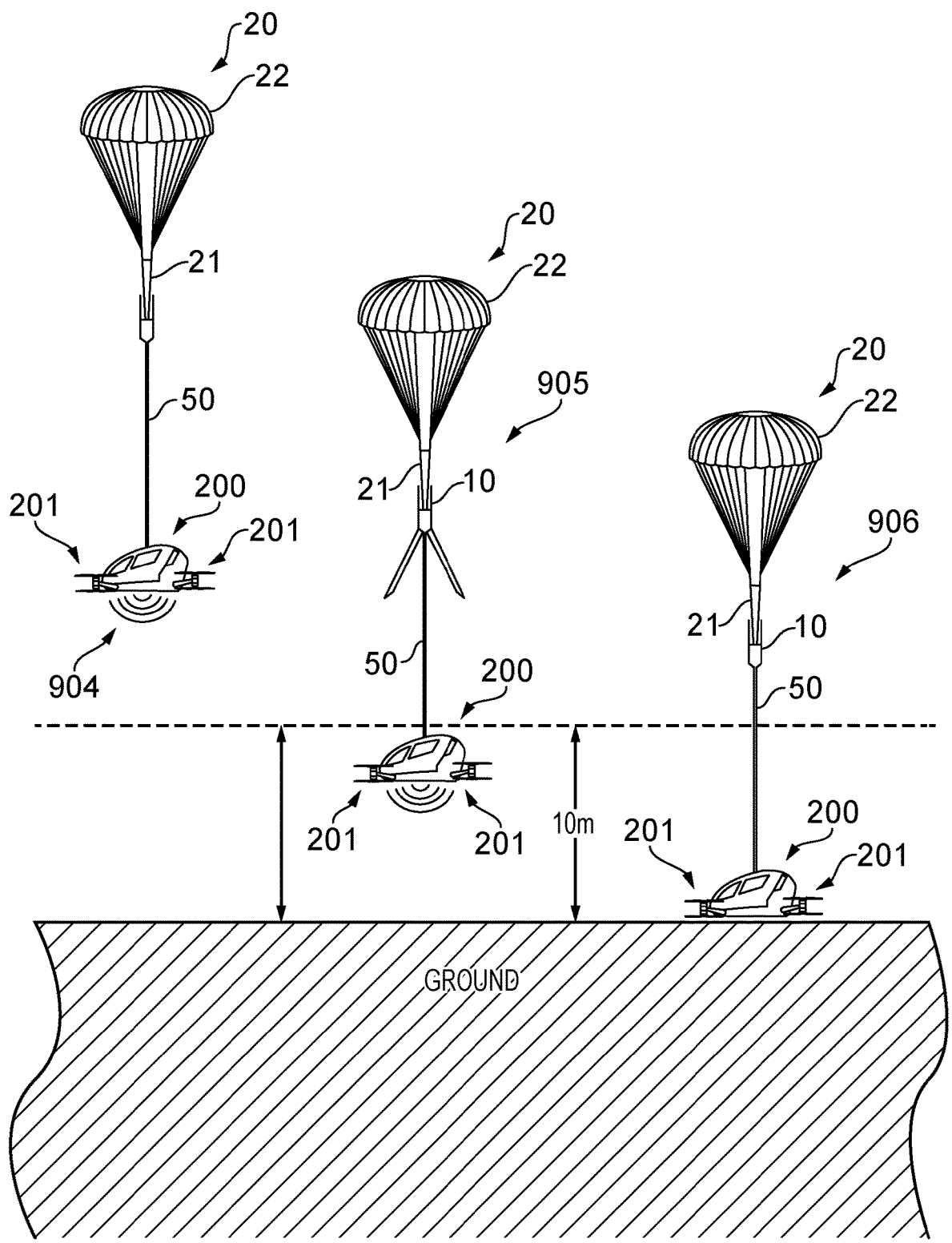

FIG. 8 illustrates a flow chart of a method of using the emergency landing apparatus 100. FIGS. 9A and 9B illustrate the implementation of that method in which the aircraft 200 performs an emergency landing using the emergency landing apparatus 100.

In block 801 in FIG. 8, the control circuitry 70 of the aircraft 200 receives and processes one or more inputs from the sensor circuitry 80 that are indicative of a need to perform an emergency landing. The control circuitry 70 responds by switching the launcher 60 from a safe mode to an armed/operative mode within 1 millisecond. The control circuitry 70 also responds by causing the launcher 60 to launch the housing 10 from the aircraft 200 within 20-30 milliseconds of determining a need to perform an emergency landing. This is illustrated in section 901 on the left-hand side of FIG. 9A. The housing 10 might, for example, be launched at a velocity of 20-30 meters per second.

In block 802 in FIG. 8, the parachute 20 is deployed from the housing 10 following ejection of the housing 10. This is illustrated in section 902 in the center of FIG. 9A. In this example, the parachute 20 is passively deployed. That is, the parachute 20 exits the housing 10 without a further force being generated to actively eject it from the housing 10. Ejection of the housing 10 from the aircraft 200 will cause upwards movement of the housing 10 and the parachute 20 positioned in the first compartment 12 of the housing 10. The parachute 20 (including the uninflated airbags 24) is arranged to be free to move relative to the housing 10 and its momentum ensures that it exits the first compartment 12 when housing 10 reaches the end of the tether 50 and is rapidly brought to a halt from its previous velocity of 20-30 meters per second. This results in passive deployment of the parachute 20. The first compartment 12 might be tapered to facilitate passive deployment of the parachute 20 including the airbags 24.

In some embodiments, the parachute 20 might instead be actively deployed. For example, it might be a ballistic parachute in which a (combustible or non-combustible) propellant is provided for ejecting it from the housing 10. The control circuitry 40 may be configured to cause deployment of the parachute 20.

In block 803 of FIG. 8, the inflatable airbags 24 are inflated following deployment of the parachute 20, causing the canopy 22 of the parachute 20 to expand rapidly (much more quickly than would otherwise be the case without the airbags 24). This is illustrated in section 903 on the right-hand side of FIG. 9A. Expansion of the canopy 22 of the parachute 20 creates increased drag, slowing the descent of the aircraft 200. FIG. 9A is not intended to illustrate the extent to which the distance between the canopy 22 and the housing 10 when the airbags 24 are inflated; it could occur at a shorter or longer distance than that illustrated in FIG. 9A.

Descent of the aircraft 200 is continually monitored by the control circuitry 40 of the emergency landing apparatus 100, by the control circuitry 70 of the aircraft 200, or both using the sensor circuitry 42 of the apparatus 100, the sensor circuitry 80 of the aircraft, or both. This is illustrated in section 904 on the left-hand side of FIG. 9B. This continual monitoring may have begun before the housing 10 was ejected to initiate the emergency landing apparatus 100 and, as explained above, may have been at least one factor in deciding to initiate the emergency landing procedure.

In block 804 in FIG. 8, the control circuitry 40 of the apparatus 100 or the control circuitry 70 of the aircraft 200 decides that an appropriate threshold altitude has been reached to activate the rocket motor 30 of the apparatus 100 and initiates it using the rocket motor initiator 38. Following initiation, the rocket motor 30 begins to generate upwards thrust. This is illustrated in section 905 in the center of FIG. 9B. The upwards thrust is sufficient to further reduce the rate of descent of the aircraft 200, possibly to 1 meter per second or less on contact with the ground, for example. In some embodiments, the rocket motor 30 might be initiated about 5 to 15 meters from ground, but in other embodiments it might be different. The height at which the rocket motor 30 is activated may be adjustable, for example, via the control circuitry 70 of the aircraft 200. Different descent velocities and aircraft weights will change the optimum height at which the rocket motor 30 is initiated in order to reduce the ground impact velocity as far as possible.

Section 906 on the right-hand side of FIG. 9B illustrates the aircraft 200 after an emergency landing has been safely performed. The control circuitry 40 of the apparatus 100 might or might not cause detachment of the parachute 20, such as upon initiation of the rocket motors 30, when the aircraft 200 makes contact with ground or at an instance in time between those two events. In the example illustrated in FIG. 9B, the parachute 20 has not been detached.

Figure 10:
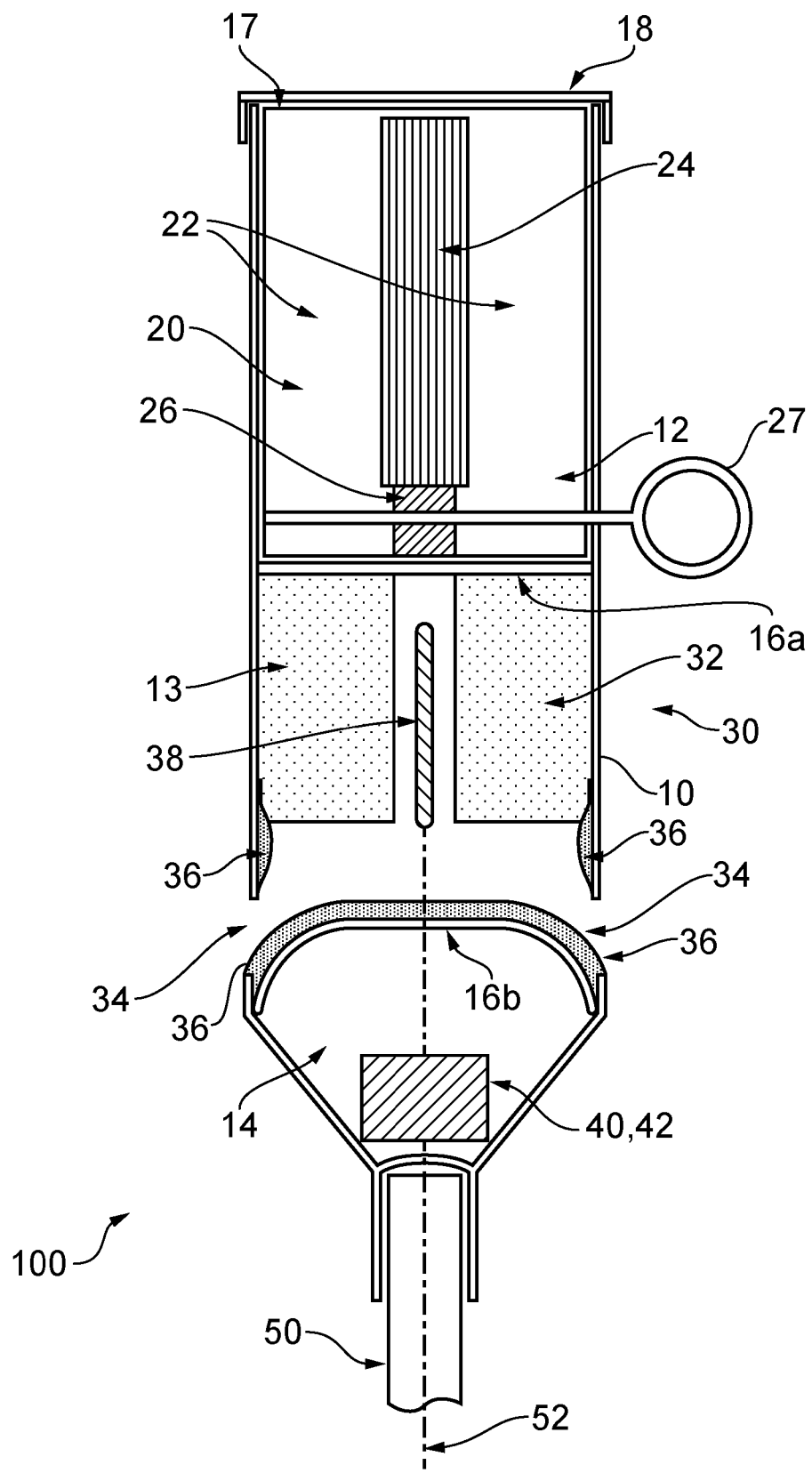
FIG. 10 illustrates a further embodiment of the emergency landing apparatus.

FIG. 10 illustrates another embodiment of the emergency landing apparatus 100 in which a safety device 27 is provided which prevents inadvertent inflation of the airbags 24 when the aircraft 200 is grounded. The safety device 27 may be safety pin that is pulled out by a person prior to take-off. In the embodiment described above in relation to FIG. 1 in which releasable lanyards are used to inflate the airbags 24, the safety device 27 may prevent the lanyards from being unraveled, thereby preventing inflation of the airbags 24 while the aircraft 200 is grounded.

Figure 11:
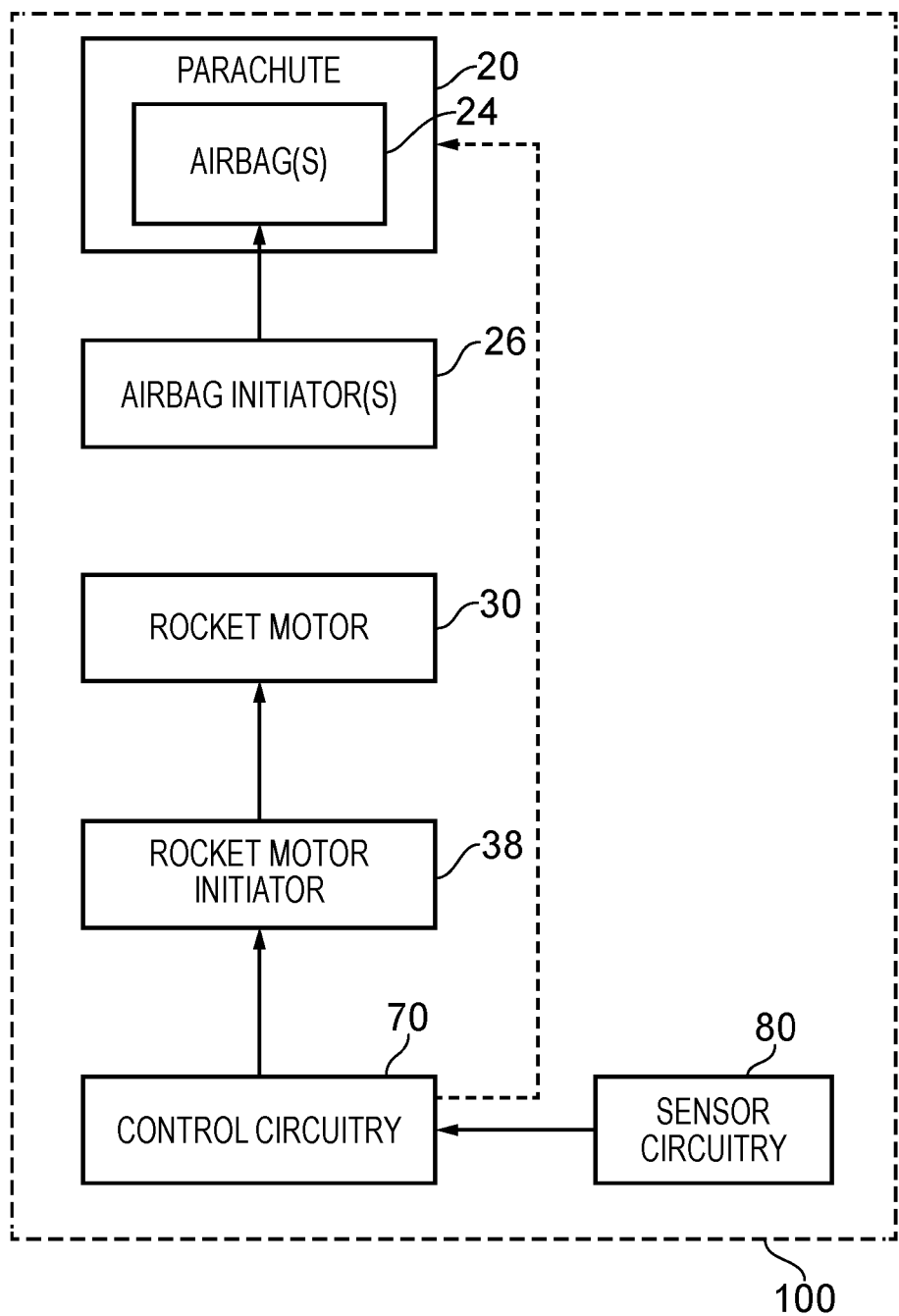
FIG. 11 illustrates a schematic of some parts of the further embodiment of the emergency landing apparatus.

FIG. 11 illustrates a schematic of an emergency landing apparatus 100 according to further embodiments of the invention. These embodiments of the invention are similar to those described above in that, in an emergency landing scenario, a parachute 20 is deployed and then one or more rocket motors 30 are initiated in order to control descent of an aircraft 200. These embodiments differ from those described above, however, in that a housing 10 is not ejected/deployed from the aircraft 200 prior to or in conjunction with the deployment of the parachute 20.

The emergency landing apparatus 100 that is used in these embodiments is in accordance with the schematic illustrated in FIG. 2. However, the control circuitry functionality is carried out by control circuitry 70 in the aircraft 200 and the sensing functionality is carried out by sensor circuitry 80 of the aircraft 200, for example, as mentioned above in the context of FIG. 7. However, unlike FIG. 7, there is no launcher 60 for launching a housing 10. Instead, the control circuitry 70 uses inputs from the sensor circuitry 80 to determine if and when to deploy the parachute 20, and if and when to initiate the rocket motor(s) 30.

FIGS. 13A, 13B, 13C and 13D illustrate a plan view, upper isometric view, lower isometric view and a front view of an example of the aircraft 200. The aircraft 200 may, for example, be a VTOL aircraft. In this example, the aircraft 200 comprises a compartment 202 for housing the parachute 20 which, in this instance, is a ballistic parachute. The aircraft 200 also comprises one or more rocket motors 30. In the illustrated example, the aircraft 200 includes at least one rocket motor 30 positioned at each wing. Alternatively or additionally, one or more rocket motor(s) 30 could be positioned elsewhere, such as on the underside of the fuselage.

Each of the rocket motors 30 is arranged to provide upwards thrust in order to control descent of the aircraft 200 in an emergency landing scenario. Each of the rocket motors 30 may, for example, be arranged to eject efflux in a groundwards direction in order to provide upwards thrust.

As explained above, the sensing circuitry 80 is configured to sense failure of the aircraft 200 and/or damage to the aircraft 200 that might be indicative of an emergency. The control circuitry 70 is configured to monitor and process inputs from the sensor circuitry 80.

Figure 12:
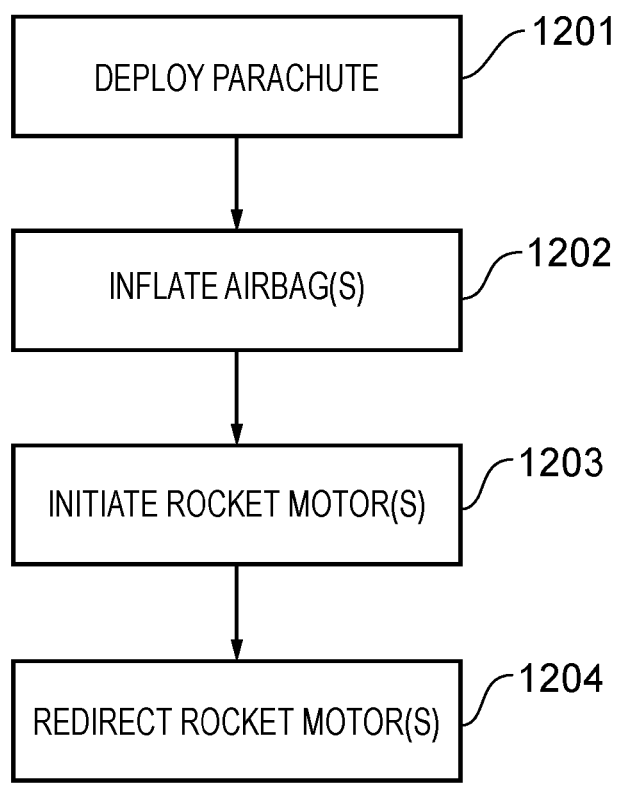
FIG. 12 illustrates a flow chart of a second method.
Figure 13A:
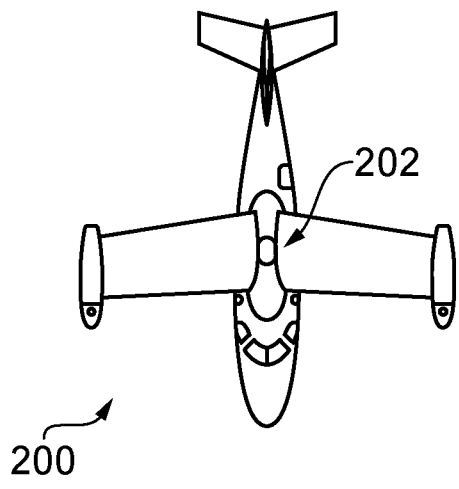
FIGS. 13A to 13D illustrate plan, isometric and front elevations of an aircraft.
Figure 13B:
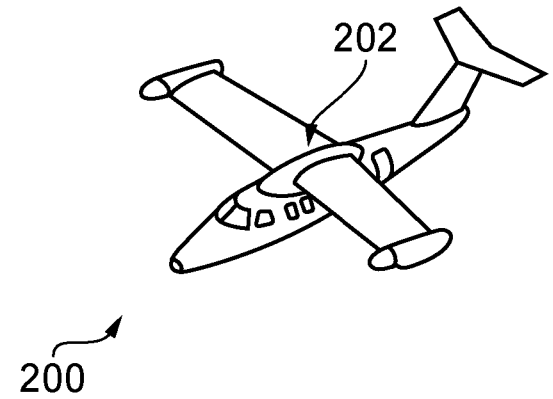
Figure 13C:
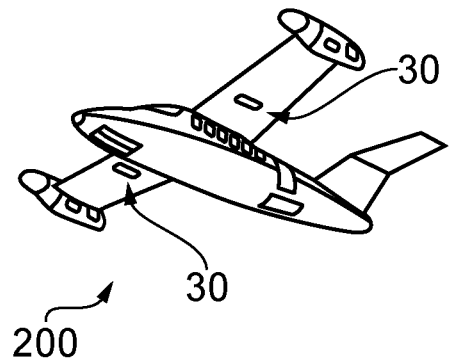
Figure 13D:
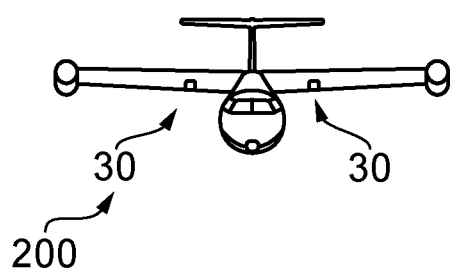

FIG. 12 illustrates a flow chart illustrating an example of a method according to the further embodiments of the invention. In block 1201 of FIG. 12, the control circuitry 70 receives one or more inputs from the sensor circuitry 80 which are indicative of an emergency situation that is causing or will cause an uncontrolled descent of the aircraft 200 (e.g. to ground or water). The control circuitry 70 responds to that in block 1201 of FIG. 12 by causing deployment of the parachute 20 from the compartment 202 in order to control descent of the aircraft 200 during emergency landing of the aircraft 200.

Figure 14A:
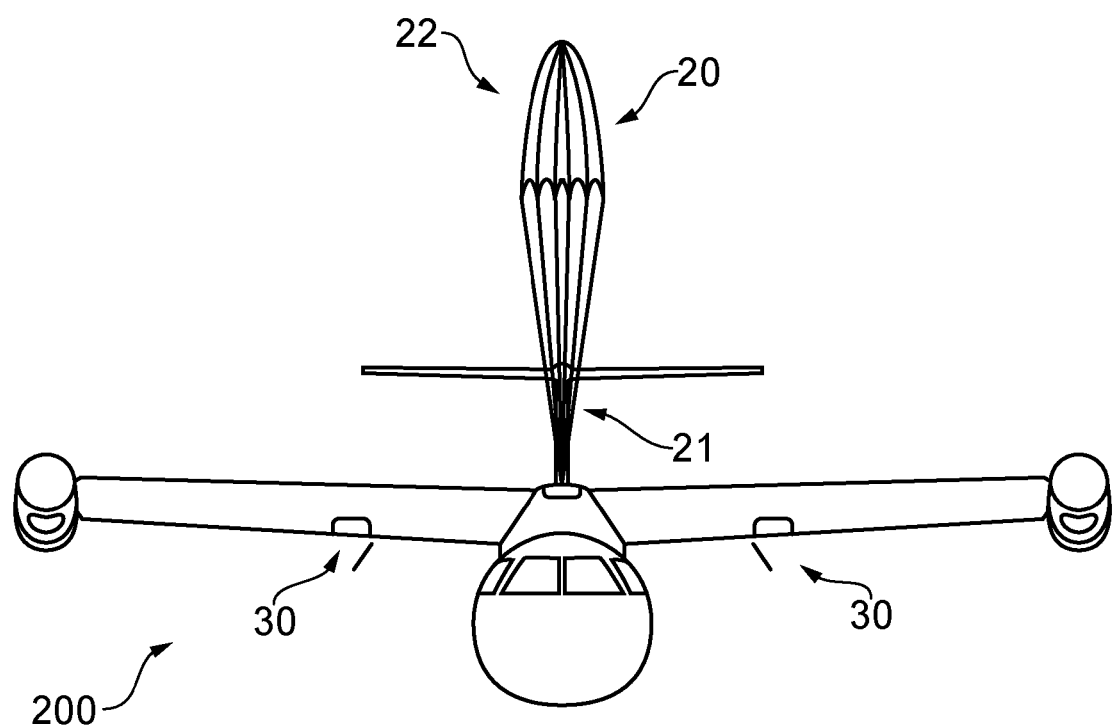
FIGS. 14A and 14B illustrates a parachute being deployed by the aircraft.

The parachute 20 may, for example, be a ballistic parachute that is ballistically/actively deployed from the compartment 202. In some examples, the compartment 202 comprises a door that may be opened under control of the control circuitry 70. In other examples, the compartment 202 comprises a cover that is removable and/or frangible. The cover is removed and/or broken when the parachute 20 is ballistically deployed. FIG. 14A illustrates the parachute 20 while it is in the process of being deployed from the aircraft 200.

Figure 14B:
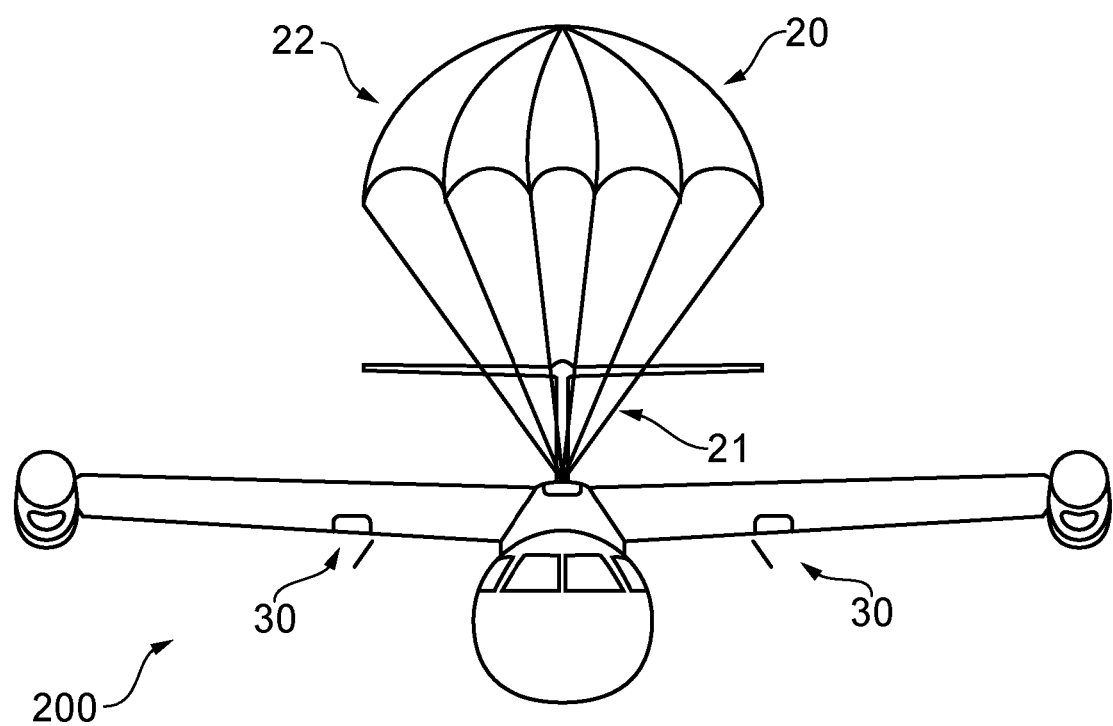

In block 1202 of FIG. 12, one or more airbags 24 of the parachute 20 cause the canopy 22 of the parachute 20 to expand/open rapidly. FIG. 14B illustrates the aircraft 200 after the canopy 22 has fully opened. The parachute 20 may be the same as that described above in relation to the other embodiments. However, in these embodiments there is no housing 10 intermediate the parachute 20 and the aircraft 200. Following deployment of the parachute 20, the one or more tethers 21 couple the parachute 20 to the aircraft 200. In this example, the one or more tethers 21 are directly connected to the aircraft 200 rather than an intermediate housing 10 which is connected to the aircraft 200.

In block 1203 of FIG. 12, the control circuitry 70 causes initiation of the rocket motors 30 via the rocket motor initiator 38. When the rocket motors 30 are initiated, they provide an upwards thrust to control descent of the aircraft 200 during emergency landing of the aircraft 200.

The control circuitry 70 decides when to initiate the rocket motors 30 based on inputs from the sensor circuitry 80. For example, the control circuitry 70 may decide to initiate the rocket motors 30 when the altitude of the aircraft 200 reduces to a threshold level.

In some examples, the control circuitry 70 may decide when to initiate the rocket motors 30 based on a descent rate of the aircraft 200, the altitude of the aircraft 200 and the current weight of the aircraft 200. The control circuitry 70 might include memory storing at least one look-up table indicating the altitude at which the rocket motors 30 are to be initiated, based at least in part on the current altitude of the aircraft 200, the descent rate of the aircraft 200 and/or the current weight of the aircraft 200.

The current weight of the aircraft 200 will have a fixed part that relates to the aircraft 200 and a variable aspect that depends on the weight of any crew members, passengers and/or cargo that are onboard the aircraft 200. The sensor circuitry 80 may include one or more weight sensors configured to determine the weight of any crew members, passengers and/or cargo that are onboard the aircraft 200, such that the necessary inputs may be provided to the control circuitry 70. Alternatively, weight measurements might be made elsewhere, or the control circuitry 70 might make weight estimates. In all of these examples, the control circuitry 70 is making a decision as to when to initiate the rocket motors 30 based on an indication of the current weight of the aircraft 200.

The rocket motors 30 eject efflux when they are operational (i.e. after initiation). The direction of the efflux depends on the orientation of the exit nozzle(s) 34 of the rocket motors 30. The efflux is directed groundwards. The ejection of the efflux causes an upwards thrust to be generated in a direction that is opposite to the direction of ejection.

Figure 14C:
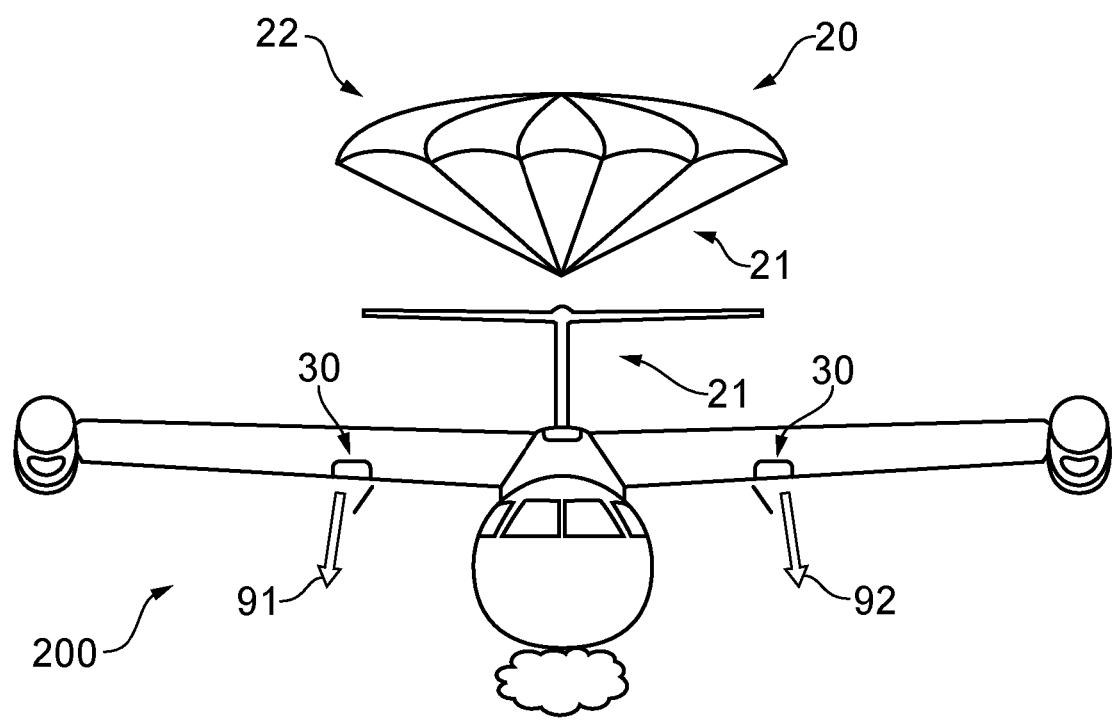
FIG. 14C illustrates detachment of the parachute from the aircraft and initiation of rocket motors of the aircraft.

FIG. 14C illustrates the rocket motors 30 of the aircraft 200 ejecting efflux in a groundwards direction, as per the arrows 91, 92. The control circuitry 70 may for example, cause the parachute 20 to be detached upon initiation of the rocket motors 30 or after initiation of the rocket motors 30, such as when the aircraft 200 makes contact with ground. FIG. 14C illustrates an example in which the parachute 20 has been detached prior to the aircraft 200 making contact with ground.

In some implementations, the efflux might be directed in a vertical direction (as per FIG. 14C). In other examples, the efflux might be angled away from the fuselage of the aircraft 200.

In block 1204 of FIG. 12, the control circuitry 70 causes thrust that is provided by each rocket motor 30 to be redirected. That is, control circuitry 70 causes the position of the exit nozzle(s) 34 of each of the rocket motors 30 to alter, relative to the (fuselage of the) aircraft 200, causing the efflux that is ejected by each rocket motor 20 to be redirected. This may be done in a manner that reduces the upwards thrust being provided by the rocket motors 30. This enables the aircraft 20 to descend slowly towards ground (or water) in a controlled manner. The control circuitry 70 might cause the thrust that is provided by each rocket motor 30 to be redirected based, at least in part, on inputs from the sensor circuitry 80, such as if at least one input that indicates that the aircraft 200 has descended to a threshold altitude (e.g. which is on or close to ground/water).

Figure 14D:
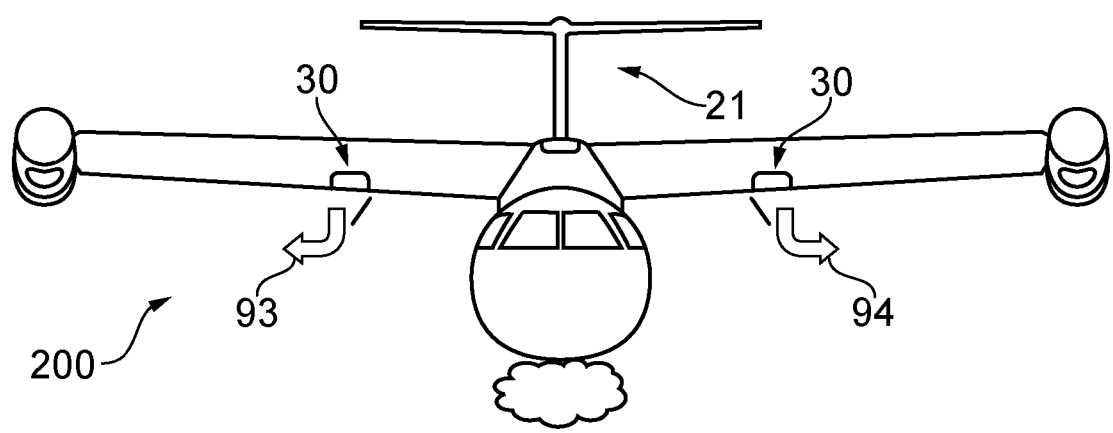
FIG. 14D illustrates redirection of the rocket motors.

FIG. 14D illustrates redirection of the efflux, as per the arrows 93, 94. In this example, the efflux is directed away from the fuselage of the aircraft 200 following redirection (or is directed away from the fuselage at a greater angle to the vertical than was previously the case prior to redirection). The horizontal component of the thrust generated by each rocket motor 30 is substantially counteracted out by the other rocket motor 30 (at the other wing), leaving only the reduced vertical component of the thrust.

Prior to redirection of the efflux of the rocket motors 30, the rocket motors 30 provide upwards thrust of a first magnitude and, following redirection of the efflux, the rocket motors provide upwards thrust of a second magnitude, where the first magnitude is greater than the second magnitude. In some instances, the second magnitude might be substantially zero. That is, the efflux may be redirected such that there is substantially no upwards thrust. In the example illustrated in FIG. 14D, the horizontal thrust from the rocket motors 30 is cancelled out following redirection, allowing the rocket motors 30 to burn out without providing a hazard once the emergency has been dealt with (e.g. the altitude of the aircraft 200 has been sufficiently reduced in a controlled manner, such that the aircraft 200 is on ground/water or close to ground/water).

The control circuitry 70 may be configured to cause movement (e.g. rotation) of at least a part of a rocket motor 30, such as the (outer) casing of the rocket motor 30 in order to redirect the efflux ejected by that rocket motor 30.

The control circuitry 70 may be configured to redirect the efflux into one or more predefined directions. For example, the efflux may be redirected from a first, original, direction, into a second direction. The direction of the efflux is continuously changing as it moves from the first direction to the second direction. At a later point in time, the efflux may then be redirected from the second direction into a third direction. The direction of the efflux is continuously changing as it moves from the second direction to the third direction. In some instances, the efflux may be redirected from the first direction into the third direction (e.g. in one continuous movement). The direction of the efflux in each of the first, second and third directions may be such that the upwards thrust that is provided is greater in the first direction than in the second and third directions, and greater in the second direction than in the third direction.

In some emergency landing scenarios, the control circuitry 70 might not cause the parachute 20 to be deployed. Instead, the control circuitry 70 might begin the method of FIG. 12 at block 1203 and initiate the rocket motors 30, redirecting the efflux ejected by the rocket motors 30 (as per block 1204 in FIG. 12) if necessary/desired. The decision as to whether to deploy the parachute 20 might depend on the inputs received by the control circuitry 70 from the sensor circuitry 80. For example, if the sensor circuitry 80 provides at least one input that is indicative of an emergency when the altitude of the aircraft 200 is below a threshold level, the control circuitry 70 may initiate the rocket motor(s) 30 without deploying the parachute 20.

Each rocket motor 30 might be a "linear rocket motor" of the same or a similar configuration to those described in prior PCT patent application WO 2014/111709, which is incorporated by reference. A "linear rocket motor" is considered to be a rocket motor comprising a casing having a length dimension, a width dimension and a height/depth dimension, where the length dimension is greater than the width dimension and the height/depth dimension, and the rocket motor 30 is configured to generate thrust in a direction that is perpendicular to the length dimension of the casing.

Advantageously, embodiments of the invention enable an aircraft 200 to safely perform an emergency landing. Emergency landing might, for example, be made possible for aircraft 200 that do not have any rotors and/or aircraft 200 that have rotors which are unable to autorotate.

Figure 15A:
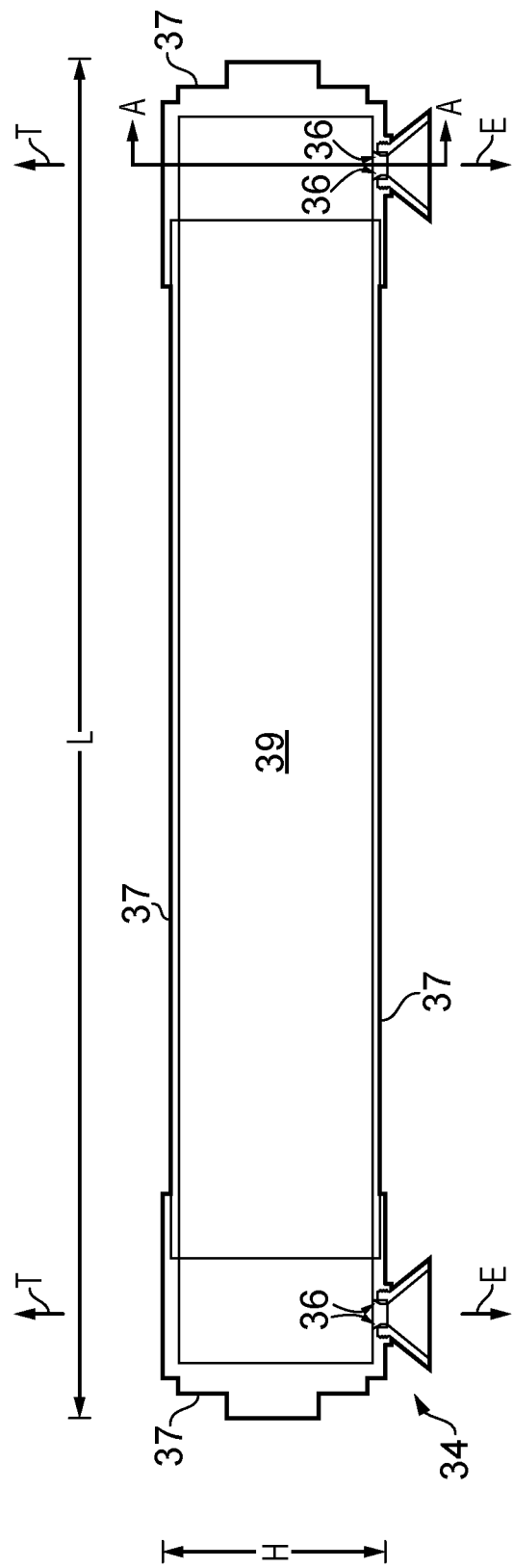
FIGS. 15A and 15B illustrate cross-sections of a rocket motor.
Figure 15B:
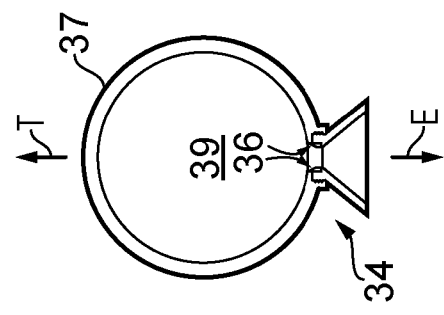

FIG. 15A illustrates a first cross section of a linear rocket motor 30 that might be used in embodiments of the invention. FIG. 15B illustrates a cross-section of the linear rocket motor 30 through the line A-A in FIG. 15A.

The linear rocket motor 30 illustrated in FIG. 15A comprises a casing 37 which comprises at least one wall. In the illustrated example, the at least one wall is a single wall having a substantially circular cross-section, but that need not be the case in every example. The length dimension L and the height/depth dimension H are indicated in FIG. 15A. The width dimension W and the height/depth dimension H are indicated in FIG. 15B.

The casing 37 defines an internal enclosure/chamber 39 in which propellent, such as solid, combustible propellant might be stored. Solid propellant is considered to be safer to use than liquid propellant. Liquid propellant is more likely to present a fire hazard when an emergency landing is performed. In at least some prior rocket motors, use of solid propellant in the rocket motor has resulted in an inability to vary the level of thrust of the rocket motor while thrust is being generated. Advantageously, in embodiments of the invention, a variable upwards thrust is achieved by re-directing the efflux from the rocket motor 30 as described above, and the safety benefit provided by the use of solid propellant is also achieved.

In this example, a plurality of diverging (cone-shaped) exit nozzles 34 protrude outwardly from the outer surface of the at least one wall of the casing 37 of the rocket motor 30. In other examples, they might extend inwardly into the casing 37. In some implementations, such as the one illustrated, an exit nozzle 34 is positioned at substantially each end of the casing 37 of the rocket motor 30. There are no exit nozzles positioned between those that are located at substantially each end of the casing 37.

In the illustrated example, each of the exit nozzles 34 includes a thread that is configured to connect it to a thread of the casing 37. A thermal insulator provides a protective lining 36 to thermally insulate each of the threaded connections between the casing 37 and an exit nozzle 34.

The arrows labelled with an E in FIG. 15A indicate the direction in which efflux is ejected from the exit nozzles 34 in use, when the propellant in the chamber 39 is burned. The arrows labelled with a T in FIG. 15B indicate the direction in which an equal and opposite thrust is generated due to the ejection of the efflux E.

Figure 16A:
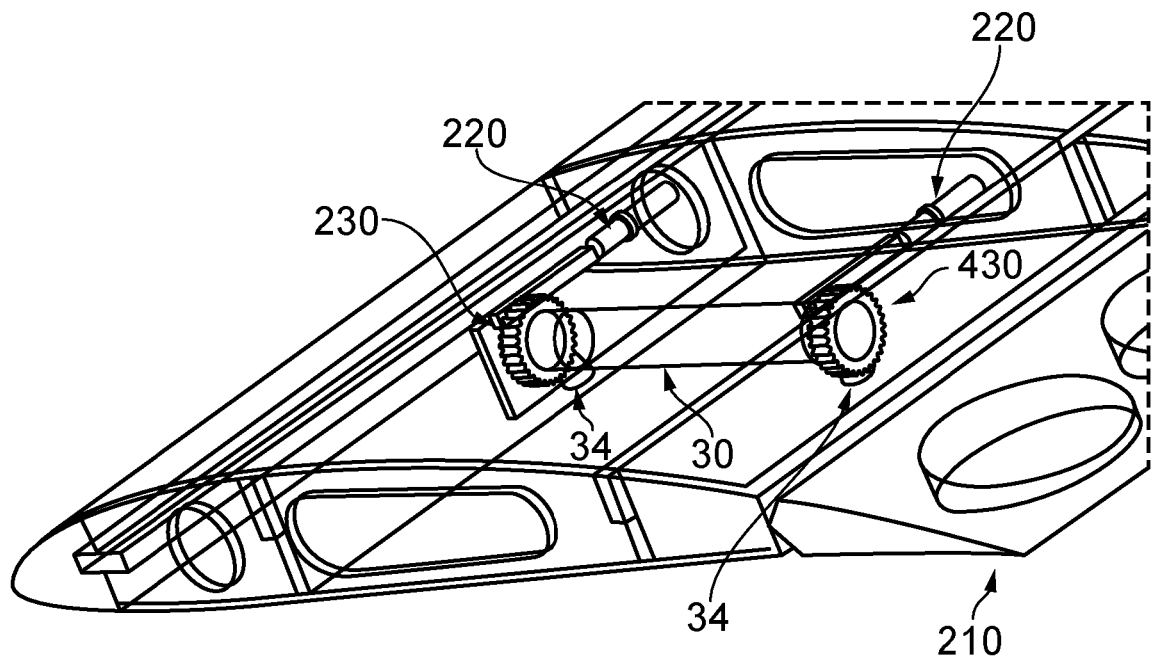
FIGS. 16A and 16B illustrate an example of a wing of an aircraft comprising redirectable rocket motors.
Figure 16B:
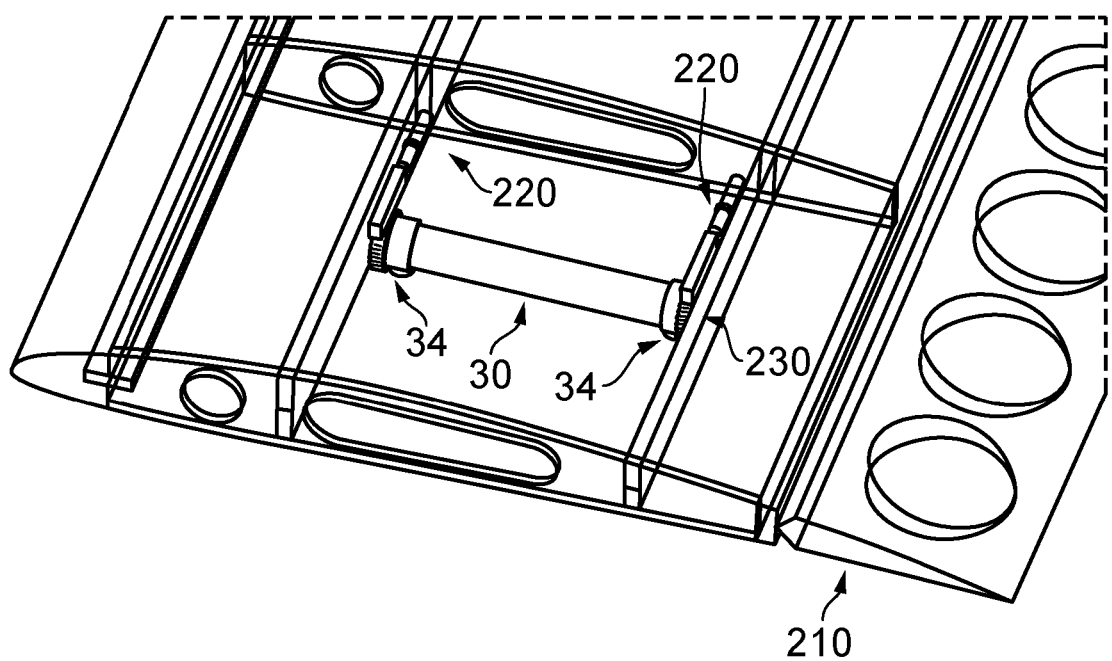

FIGS. 16A and 16B illustrate the rocket motor 30 of FIGS. 15A and 15B positioned at a wing 210 of an aircraft 200. In this example, the rocket motor 30 is positioned within the wing 210, but in other examples in might be positioned underneath the wing 210, for instance.

The control circuitry 70 is configured to provide control signals to cause the rocket motor 30 to move/rotate. In this regard, an actuator 220, such as a Metron/explosively driven ram actuator or an electrical actuator, may be used to provide the force to the rocket motor 30 that causes it to move/rotate, under the control of the control circuitry 70. The electrical actuator may be or comprise a stepper motor, for example, which is configured to move/rotate the rocket motor 30 in discrete steps.

The actuator 220 is coupled to a rack and cog system which enables the casing of the rocket motor 30 to rotate outwardly into a plurality of different positions, causing the direction in which efflux is ejected to be adjusted. The rocket motor 30 might be rotated through more than 45 degrees when moving from a first position to a second position. In some examples, the rocket motor 30 might be rotated through 75-80 degrees when moving from the first position to the second position. In the illustrated example two exit nozzles 34 are provided for ejecting efflux, but in other examples more or fewer exit nozzles 34 might be provided.

In some examples, the rocket motors 30 on each side/wing of the aircraft 200 might be moved/rotated by the same extent (e.g. at the same time). Alternatively, the rocket motors 30 on each side/wing of the aircraft 200 may be moved/rotated to different extents to provide some lateral thrust to assist in steering the aircraft to a preferred landing location.

Figure 17A:
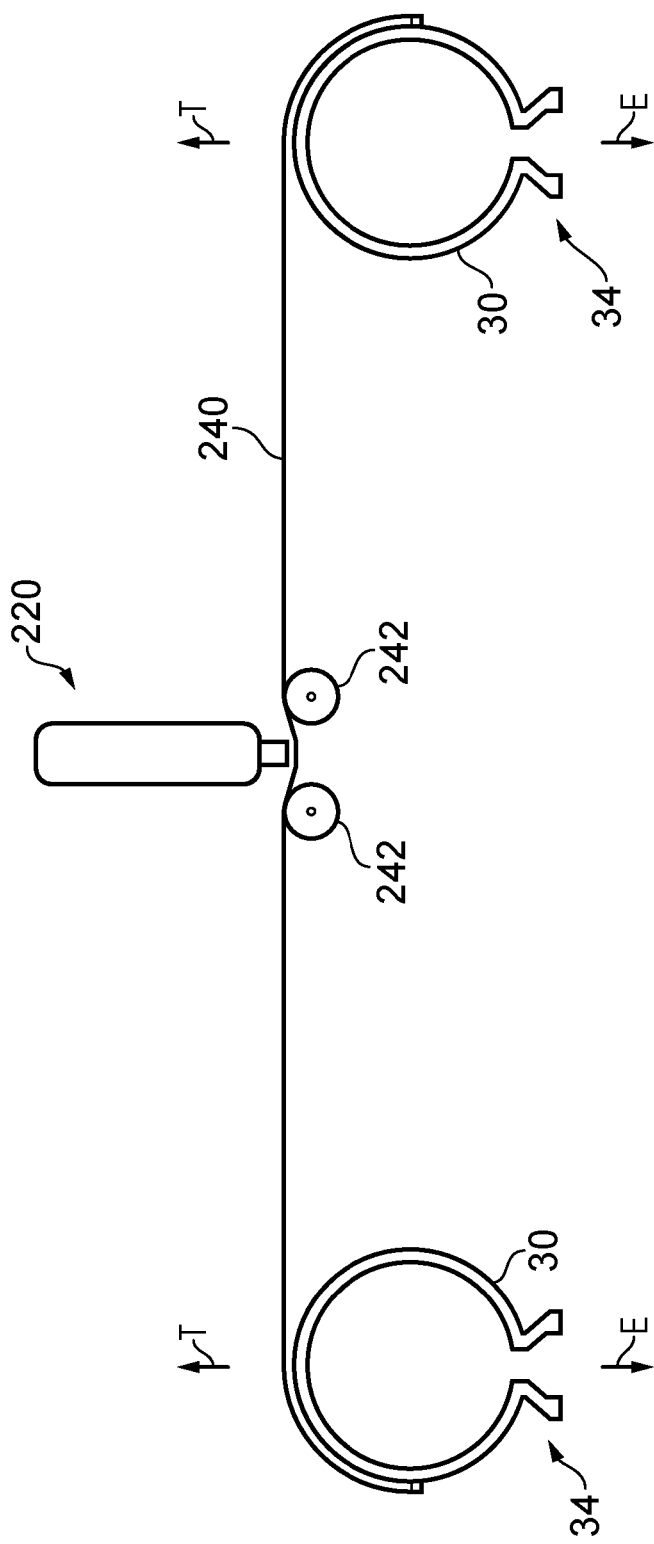
FIGS. 17A and 17B illustrate a schematic showing the simultaneous redirection of rocket motors.
Figure 17B:
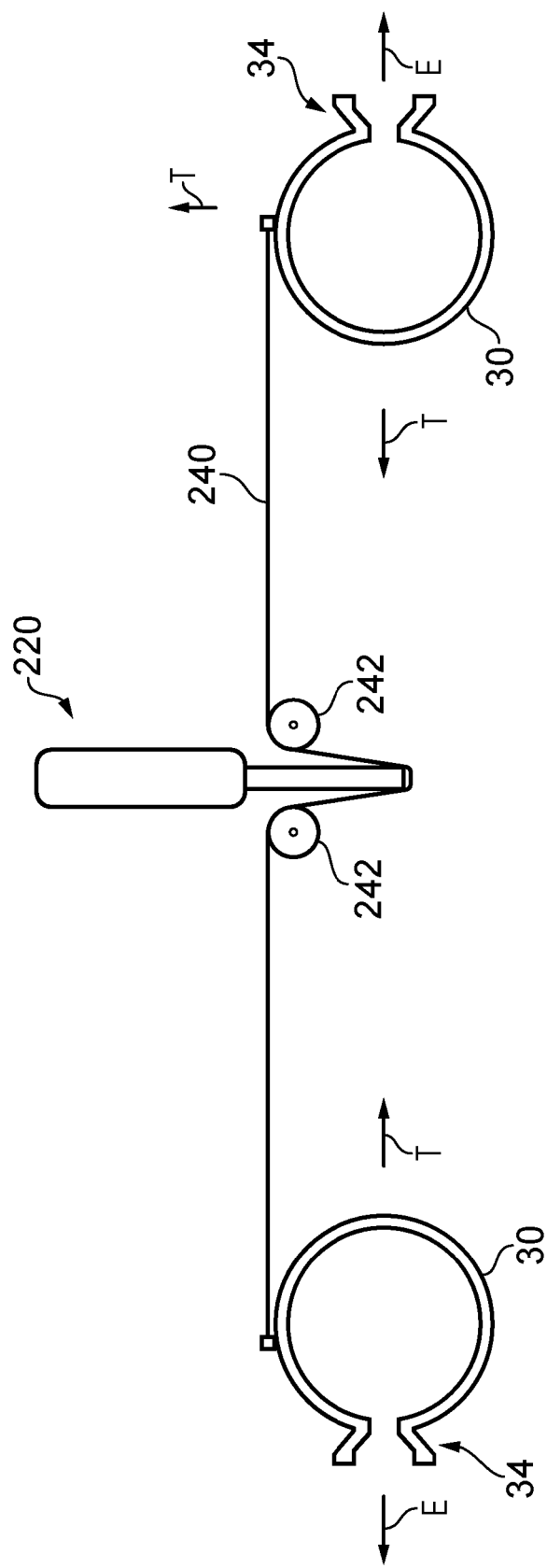

FIGS. 17A and 17B illustrate a schematic showing how rocket motors 30 might be moved/rotated substantially simultaneously. Each of the rocket motors 30 illustrated in FIGS. 17A and 17B is positioned on a different wing 210 of the aircraft 200. FIG. 17A illustrates the rocket motors 30 prior to reorientation; FIG. 17B illustrates the rocket motors 30 following reorientation. The direction of the ejected efflux E and the corresponding thrust T are shown in FIGS. 17A and 17B.

In the illustrated example, the rocket motors 30 are connected together by a tractor 240, which might be a cable or belt, for instance. The tractor 242 extends across a plurality of pulleys 242.

The control circuitry 70 is configured to cause an actuator 220 to apply a force to the tractor 240, which causes the tractor 240 to apply a pulling force to each of the rocket motors 30, rotating them outwardly. This is achieved in the illustrated example by the actuator 220 applying a force to the tractor 240 at a location between the two pulleys 242. The outward rotation of the rocket motors 30 changes the orientation of the (exit nozzles 34 of the) rocket motors 30, redirecting the efflux that is being ejected and reducing the magnitude of the upwards thrust that is being provided.

FIGS. 18A, 18B, 18C and 18D illustrate an end view, a side view, an underside perspective view and an elevated perspective view of another embodiment of the emergency landing apparatus 100. The emergency landing apparatus 100 comprises a housing 10, one or more rocket motors 30 and a compartment 12 for storing a parachute 20 (not shown in FIGS. 18A to 18D for clarity). The compartment 12 may be covered by a cover (not shown), which might be removable and/or frangible.

The emergency landing apparatus 100 illustrated in FIGS. 18A to 18D is similar to those illustrated in FIGS. 1, 6, 9A, 9B and 10 in that the apparatus 100 is deployable/ejectable/launchable from an aircraft 200 and is coupled to the aircraft 200 by at least one tether 50 following deployment/ejection/launch. An electrical connection to the aircraft 200 may be maintained following deployment, as explained above.

In the illustrated example, a plurality of rocket motors 30 is provided. The rocket motors 30 have the same form as those described above in relation to FIGS. 15A and 15B and operate in a similar manner. The efflux of the rocket motors 30 is controlled in a similar manner in to that described above in relation to FIGS. 16A to 17B and, as such, aspects of the description of that control are applicable here.

In this example, the emergency landing apparatus 100 and the housing 10 have the general shape of a triangular prism, but other shapes are possible. The housing 10 of the apparatus 100 includes end caps 110.

FIGS. 19A, 19B, 19C and 19D show the same views as FIGS. 18A to 18D, but the end caps 110 have been removed. FIG. 20 includes a larger version of FIG. 19C, with an end cap 110 also shown.

The parachute 20 stored in the compartment 12 is steerable. It might, for example, be a ram-air parachute or a Rogallo wing parachute. The apparatus 100 comprises a steering mechanism 130 for steering the parachute 20 after it has been deployed from the housing 10. The steering mechanism 130 is coupled to the parachute 20 by one or more steering lines. Each steering line may provide a direct connection between the steering mechanism 130 and the canopy 22 of the parachute 20. For example, a first steering line may extend from the steering mechanism 130 to a position at or close to a first end/edge of the canopy 22, and a second steering line may extend from the steering mechanism 130 to a position at or close to a second end/edge of the canopy 22.

The steering mechanism 130 may be configured to steer the steerable parachute by increasing and/or decreasing a length of at least one of the steering lines between the steering mechanism 130 and the canopy 22. In the illustrated example, the steering mechanism 130 comprises a first steering winch and a second steering winch that are provided at opposite ends of the housing 10. Each steering winch is configured to reel in and reel out its steering line(s) as necessary to steer the parachute 20 (and thereby steer the coupled aircraft 200).

The steering mechanism 130 may be controlled by the pilot of the aircraft 200 or may be controlled autonomously by control circuitry 70 of the aircraft 200 or may be controlled autonomously by control circuitry 40 of the apparatus 100.

FIGS. 21A, 22B, 22C and 22D illustrate an end view, a side view, an underside perspective view and an elevated perspective view of the emergency landing apparatus 100 shown in FIGS. 18A to 18D, where portions of the housing 10 are transparent to show the interior of the apparatus 100.

Operation of the rocket motors 30 of the apparatus 100 is best understood from FIGS. 21A to 22D. As explained above in relation to other embodiments, the rocket motors 30 are arranged to provide upwards thrust to control descent of an aircraft 200 during emergency landing of the aircraft 200. Initiation of the rocket motors 30 may be controlled by control circuitry 70 of the aircraft 200 or control circuitry 40 of the apparatus 100. After the apparatus 100 has been deployed/ejected from the aircraft 200, the exit nozzles 34 of the rocket motors 30 are initially arranged to eject efflux groundwards (vertically or in a direction which is angled, to some extent, to the vertical). This initial positioning of the exit nozzles 34 is illustrated in FIGS. 18A to 21D. When the exit nozzles 34 are positioned in this manner, the ejection of the efflux causes an upwards thrust to be generated in a direction that is opposite to the direction of ejection.

In order to change the direction of the efflux and the thrust that is generated, the exit nozzles 34 may be moved/rotated, for example, by moving at least part of the casing of each rocket motor 30 in the manner described above in relation to FIGS. 17A and 17B. Control circuitry 40/70 of the apparatus 100 or the aircraft 200 may provide a control signal to initiate movement of the exit nozzles 34. The apparatus 100 comprises means for moving the exit nozzles 34 that is responsive to such a control signal. The means may comprise one or more Metron actuators/explosively driven rams 162 and/or one or more stepper motors, for example. In the illustrated example, the means comprises a plurality of explosively driven rams 162. In practice, only one explosively driven ram 162 might be required, but inclusion of a plurality provides some redundancy in case of a failure to fire, for example.

In response to receiving a control signal, the explosively driven ram 162 applies a (downwards) force to a tractor/chain 164 which is coupled to the rocket motors 30. In this example, the tractor 164 extends around and is connected to a periphery of the casing of each rocket motor 30. When the explosively driven ram 162 applies a force to the tractor 164, the tractor 164 pulls the rocket motors 34, rotating each of their casings and rotating the exit nozzles 34 outwardly (simultaneously). Movement of the exit nozzles 34 in this manner reduces the vertical component of the thrust generated by the rocket motors 34.

At least one stop 115 may be provided to limit the movement of the exit nozzles 34 of the rocket motors 30. In the illustrated example, an elongate stop 115 is positioned on the exterior of each elongate side of the housing 10 to limit such movement, but it will be appreciated by those skilled in the art that other forms of stop could be used. The apparatus 100 further comprises at least one receptacle 144 defining an internal chamber for storing a coolant, such as carbon dioxide. The coolant is a fluid and might be in a liquid state or a gaseous state, for example. In this example a receptacle 144 storing coolant is provided for each rocket motor 30, but in other instances a single receptacle 144 could be provided for storing coolant for multiple rocket motors 30.

The apparatus 100 includes at least one conduit 140 which defines a channel along with coolant may pass from the receptacle(s) 144 and the internal chambers of the rocket motors 30. At least one valve 142 is provided for controlling the passage of coolant along the at least one conduit 44, from the receptacle(s) 144 to the internal chamber(s) 39 of the rocket motors 30.

The valve 142 is configured to transition from a closed state to an open state in response to initiation of a rocket motor 30 (that is, when the propellant in the internal chamber 39 of the rocket motor 30 is ignited). For example, pressure generated from combustion of the propellant may cause the value 142 to transition automatically from the closed state to the open state. When the valve 142 is in its closed state, it is configured to prevent the coolant from passing from the receptacle(s) 144 to the internal chamber(s) of the rocket motor(s) 30. When the value is in its open state, it is configured to enable the coolant to pass from the receptacle(s) 144 to the internal chamber(s) 39 of the rocket motor(s) 30.

When the valve 142 transitions to its open state, the pressure generated from combustion of the propellant prevents the coolant from entering the internal chamber(s) 39 of the rocket motor(s) 30 for a period of time, while the pressure generated from combustion of the propellant is greater than the (static) pressure generated by the coolant. However, during the combustion process a point in time is reached where the pressure generated by the coolant exceeds the pressure in the internal chamber(s) 39 of the rocket motor(s) 30. When this occurs, the coolant enters the internal chamber(s) 39, cooling the internal chamber(s) 39. Advantageously, this prevents residual burning in the internal chambers 39 which might otherwise create a safety hazard.

In this example, the at least one conduit provides an open channel between the internal chambers 39 of the rocket motors 30. When the valve 142 is in its closed state, the channel between the rocket motors 30 remains open, but the channel(s) from the receptacle(s) 144 storing the coolant and the internal chamber(s) 39 of the rocket motors is/are closed by the valve 142 (such that no coolant can pass from the receptacle(s) 144 to the internal chamber(s) 39). Thus, if one rocket motor 30 is successfully initiated, the open channel between the internal chamber 39 of that rocket motor 30 and the internal chamber 39 of the other rocket motor 30 should ensure that the other rocket motor 30 is successfully (fully) initiated. This means that the rocket motors 30 each generate substantially the same thrust, which is particularly important following rotation of the exit nozzles 34. If the thrust generated by rocket motors 30 were not substantially the same following the rotation of the exit nozzles 34, a net horizontal thrust would be produced in addition to a net upwards thrust, which may be undesired.

FIGS. 22A to 22D illustrate emergency landing apparatus of FIGS. 18A to 22D and its parachute being deployed.

In this example, the parachute 20 stored in the compartment 12 is ballistically/actively deployed and is steerable. The additional detail shown in FIG. 20 (omitted from other figures for clarity reasons) illustrates first and second rockets 180, each of which is coupled to the parachute 20 by one or more tractors/lines. The rockets 180 are arranged to follow divergent trajectories, following their initiation, in order to ballistically deploy the parachute in a rapid manner.

Figure 22A:
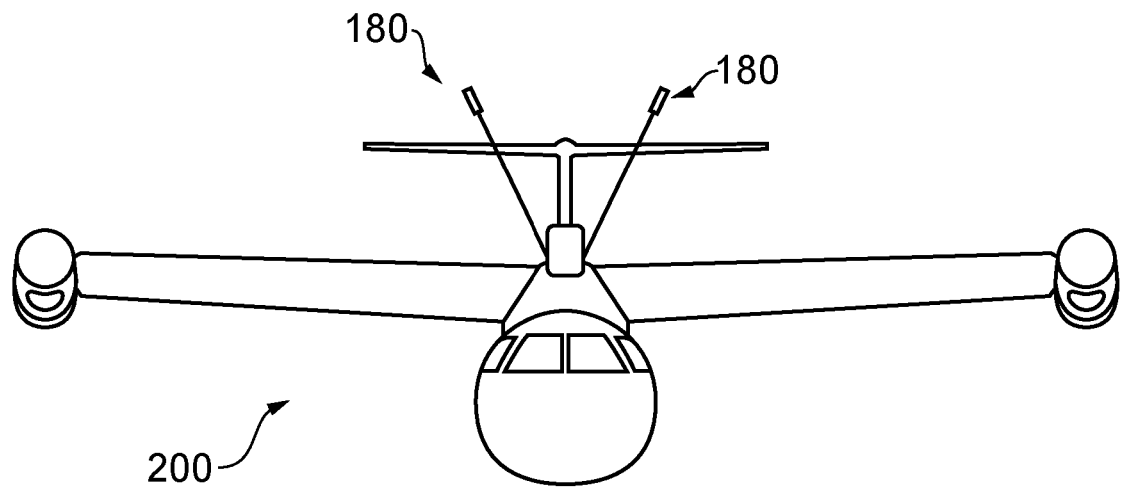
Figure 22B:
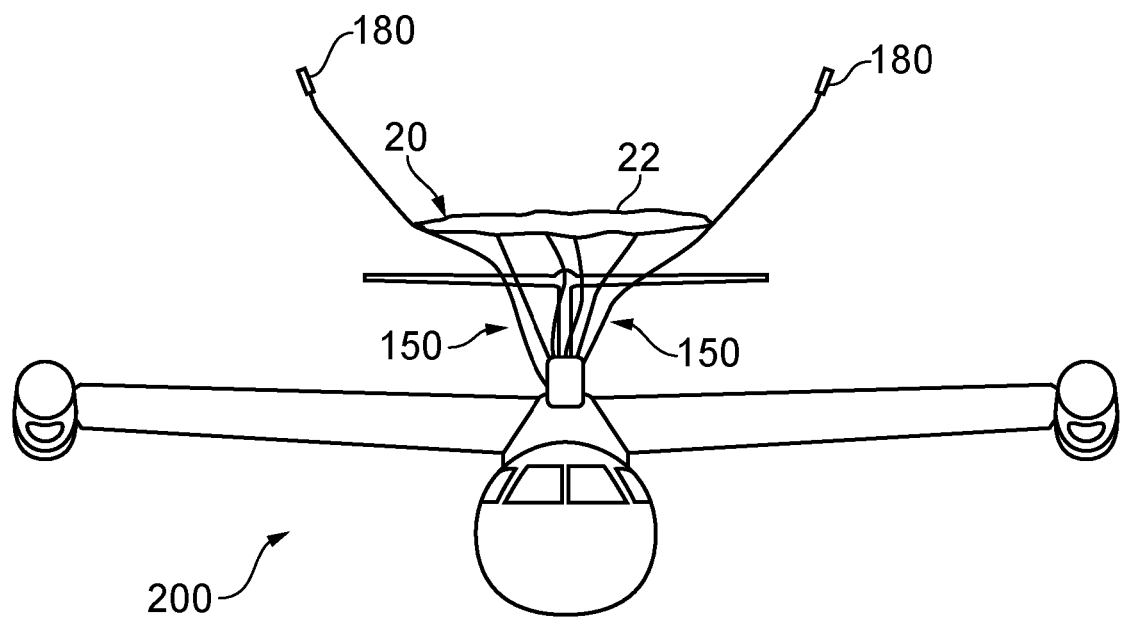
Figure 22C:
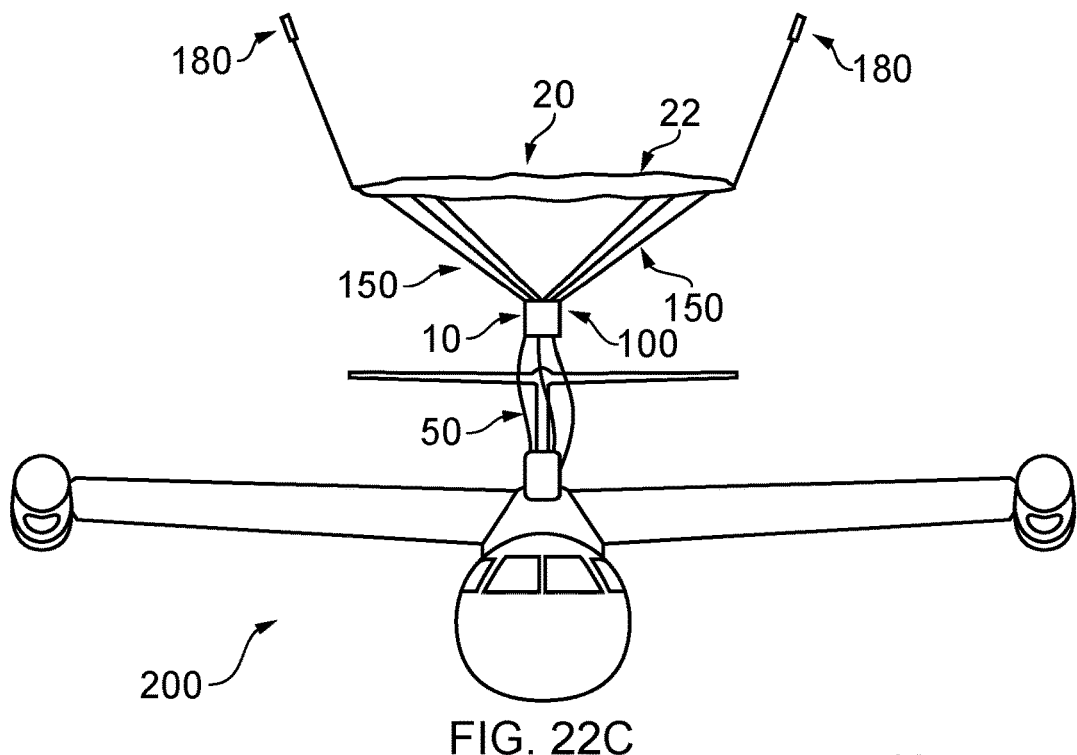
Figure 22D:
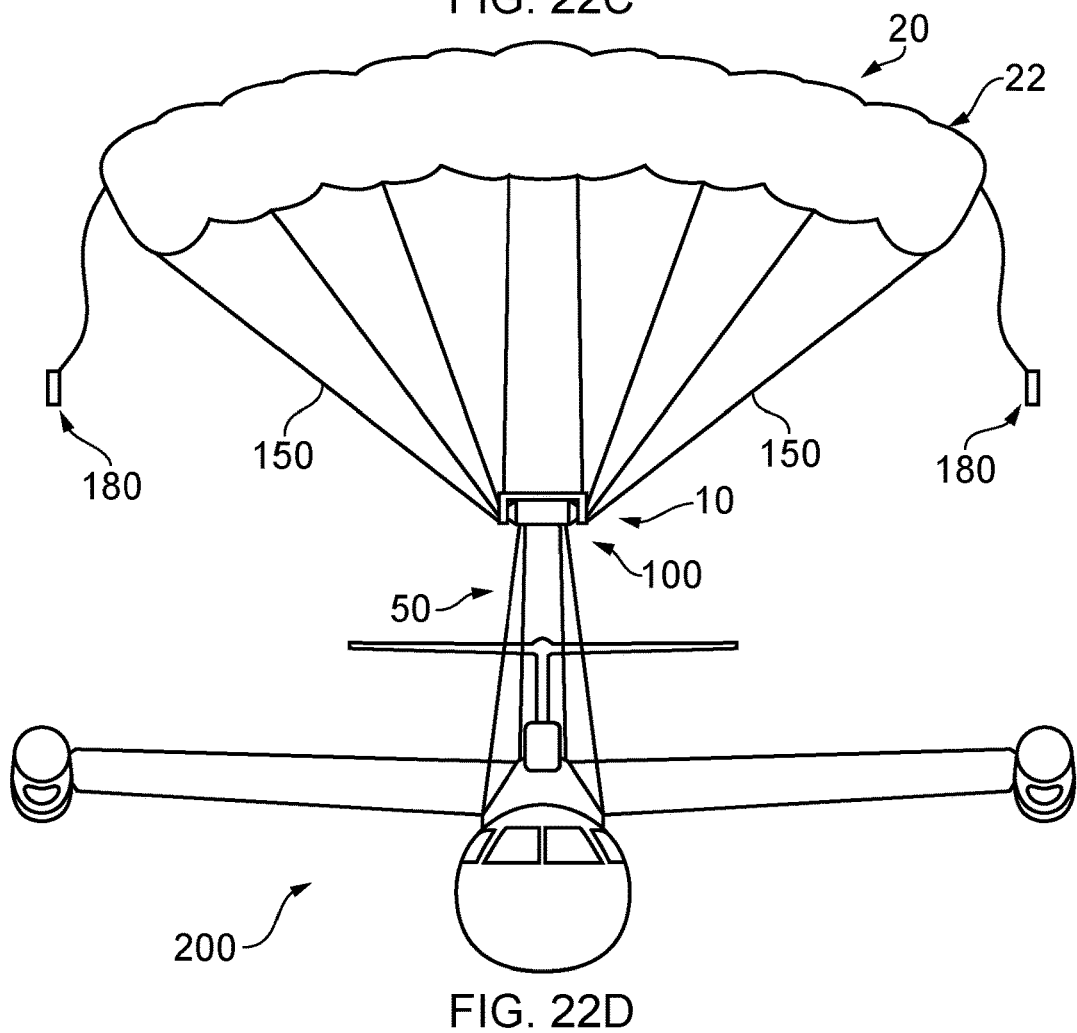

FIG. 22A illustrates a point in time in which the first and second rockets 180 have been initiated and are following divergent trajectories from one another. The rockets 180 are tethered to the canopy 22 of the parachute 20 and cause it to open rapidly. FIG. 22B illustrates a point in time in which the canopy 22 is partially open. The canopy 22 is coupled to the housing 10 of the apparatus 100 by, for example, one or more steering lines 150 and/or one or more (other) tethers. As the canopy 22 opens, it applies an upwards force to the housing 10, causing it to deploy/eject from the aircraft 200. This is illustrated in FIG. 22C. It can also be seen in FIG. 22C that the housing 10 is coupled to (the fuselage of) the aircraft 200 by one or more tethers 50. Those tethers 50 eventually become taut in conjunction with the opening of the canopy 22, as shown in FIG. 22D. The parachute 20 reduces the rate of descent of the aircraft 200 and potentially enables a safe landing to be performed. The aircraft 200 can be steered using the steering lines 150 which connect the housing 10 to the canopy 22, enabling a safe landing location to be reached.

As explained above, the apparatus 100 and/or the aircraft 200 may include one or more sensors/sensor circuitry 42/80 which may be used to determine when to initiate the rocket motors 30. For instance, when the aircraft 200 is close to ground or water (e.g. 5 to 15 meters from ground or water), the rocket motors 30 may be initiated to reduce the rate of descent of the aircraft 200. Subsequently the exit nozzles 34 of the rocket motors 30 may be moved/rotated in the manner described above, redirecting the efflux that is being ejected and reducing the magnitude of the upwards thrust that is being provided, thereby enabling the aircraft 200 to land safely.

It was explained above that emergency landing apparatus 100 may include sensors/sensor circuitry 80 for sensing a descent rate of an aircraft 200. FIG. 23 includes an example of such sensors 809. The sensors 809 are configured to sense the altitude of the aircraft 200. The sensors 809 may be retrofitted to an aircraft 200, or fitted when the aircraft 200 is manufactured. The sensors 809 are positioned on a curved surface 400, which may be formed by a portion of a sphere.

For example, the surface 400 may comprise at least a hemispherical portion of a sphere. It might be substantially hemispherical.

The sensors 809 are coupled to an underside of an aircraft 200, such as the fuselage of the aircraft 200. For example, an upper surface/portion 401 may be coupled to an underside of the fuselage of the aircraft 200. The upper surface/portion 401 is substantially flat in the illustration, but need not be in other examples.

FIG. 23 illustrates a first axis 501, a second axis 502 and a third axis 503. The third axis 503 extends into and out of the page in FIG. 23. The sensors 809 are distributed about the first, second and third axes 501, 502, 503. When the sensors 809 are coupled to an underside of an aircraft 200, the first axis 501 may be substantially parallel to (and possibly coincident with) the normal/yaw axis of the aircraft 200. The second axis 502 may be substantially parallel with the transverse/lateral/pitch axis of the aircraft 200. The third axis 503 may be substantially parallel with the longitudinal/roll axis of the aircraft 200.

The sensors 809 may be distributed about a solid angle of at least (substantially) π steradians or at least (substantially) 2π steradians. In the illustrated example, the sensors 809 are distributed about a solid angle that is substantially 2π steradians.

The sensors 809 may be configured to transmit and receive wireless signals, such as radio signals or light signals (e.g. laser signals), in order to sense the altitude of the aircraft 200. Wireless signals transmitted by the sensors 809 may be reflected from ground or water such that the reflections are received at the sensors 809.

The sensors 809 might be arranged/directed such that they collectively to transmit (and receive) wireless signals across a solid angle of at least (substantially) 1T steradians or at least (substantially) 2rr steradians, although in some embodiments it could be less. One or more gaps may exist within the solid angle in which there is no signal coverage.

In an emergency landing situation, the control circuitry 70 is configured to determine when to initiate the rocket motor(s) 30 to provide upwards thrust, based at least in part on inputs from the sensors 809. The control circuitry 70 may be able to determine the descent rate of the aircraft 200 from inputs provided by the sensors 809 over a period of time, and the altitude of the aircraft 200 from one or more inputs provided by the sensors 809 at an instance in time.

An advantage of the sensor distribution illustrated in FIG. 23 is that the sensors 809 are able to determine the altitude of the aircraft 200 across a large range of pitch, roll and yaw angles. In some embodiments, the control circuitry 70 might determine the altitude of the aircraft 200 to be the lowest measurement determined by the sensors 809, or it might make an interpolation from multiple measurements.

FIG. 24 illustrates a flow chart of a method which may incorporate any of the aspects of the invention described above.

In block 2401 of FIG. 24, sensors/sensor circuitry 42/80 of the apparatus 100 and/or the aircraft 200 sense failure of the aircraft 200 and/or damage to the aircraft 200 that may be indicative of an emergency, as described above.

In block 2402 of FIG. 24, optionally, if the emergency landing apparatus 100 comprises a deployable housing 10, in response to sensing failure of the aircraft 200 and/or damage to the aircraft 200 that may be indicative of an emergency in block 2401, that housing 10 is deployed in the manner described above.

In block 2403 of FIG. 24, optionally, if the emergency landing apparatus 100 comprises a parachute 20, such as any of the parachutes described above, the parachute 20 is deployed in the manner described above. It might be an actively deployed ballistic parachute 20 and/or it might include one or more inflatable airbags 24 for rapid deployment.

In block 2404 of FIG. 24, the control circuitry 40 of the apparatus 100 and/or the control circuitry 80 of the aircraft 200 monitors inputs from the sensors/sensor circuitry 42/80 in order to monitor the altitude, descent rate and/or current weight of the aircraft 200. This monitoring may commence before, after on upon sensing an emergency in block 2401.

In block 2405 of FIG. 24, the control circuitry 40 of the apparatus 100 or the control circuitry 80 of the aircraft 200 initiates the one or more rocket motors 30. After the rocket motors 30 have been initiated, they provide an upwards thrust to control descent of the aircraft 200 to enable an emergency landing to be performed. The control circuitry 40/80 determines when to initiate the rocket motor(s) 30 based, at least in part, on the sensed altitude, descent rate and/or current weight of the aircraft 200. The control circuitry 40/80 may include memory storing a look-up table indicating when the rocket motors 30 are to be initiated based on the sensed altitude, descent rate and current weight of the aircraft 200.

At block 2406 of FIG. 24, optionally, if multiple rocket motors 30 are provided and one or more conduits 140 are provided coupling the internal chambers of those rocket motors 30 to one another, failure to initiate a particular rocket motor 30 may be prevented by the passage of hot gas from an internal chamber of a successfully initiated rocket motor 30 to an internal chamber of a rocket motor 30 that was not successfully initiated. Also, at block 2406 of FIG. 24, if a valve 142 is provided which controls the passage of coolant to an internal chamber of a rocket motor 30, that valve 142 is opened by the high pressure generated in the internal chamber of the rocket motor 30.

At block 2407 of FIG. 24, optionally, following the initiation of the rocket motors 30, the efflux of the rocket motors 30 may be re-directed to reduce the upwards thrust being provided in the manner described above. The efflux may be re-directed by rotating the rocket motors 30. The re-direction may be a continuous process which is achieved by gradual rotation of the rocket motors 30. The graduation reduction in the upwards thrust provides a controlled landing for the aircraft 200.

The rocket motors 30 continue to burn until substantially the whole of the (solid) propellant has been consumed. When this has occurred, optionally, at block 2408 of FIG. 24, if coolant is provided, the coolant is able to enter the internal chambers of the rocket motors 30 to cool them.

At block 2409 of FIG. 24, optionally, if a parachute 20 was deployed, that parachute 20 is detached. It may be detached, for example, as the aircraft 200 lands. Freed from the weight of the aircraft 200, the parachute 20 drifts away from the aircraft 200, potentially taking the housing 10 with it (if a housing 10 has been deployed).

Where a structural feature has been described, it may be replaced by means for performing one or more of the functions of the structural feature whether that function or those functions are explicitly or implicitly described.

Although embodiments of the present invention have been described in the preceding paragraphs with reference to various examples, it should be appreciated that modifications to the examples given can be made without departing from the scope of the invention as claimed. For example, the emergency landing apparatus 100 may include alert circuitry (such as a red warning light) which is activated upon the powering up/arming of the airbag initiator(s) 26, the rocket motor initiator 38, control circuitry 40 and/or the sensor(s) 42. This might occur, for example, if the apparatus 100 is dropped, causing activation of an inertial switch.

In all of the embodiments described above, the parachute 20 might be a steerable parachute. The steerable parachute 20 may be controlled by the control circuitry 40/70 (e.g. controlling the tethers 21 via electric motors) to control the path of the aircraft 200 as it descends. The parachute 20 could be a Rogallo wing-type parachute or a ram-air parachute.

An audible and/or visual warning signal might be provided from the aircraft 200 in the event of an emergency, under the control of the control circuitry 70 and in response to one or more inputs from the sensor circuitry 42/80.

Rather than rotating or moving the whole of a rocket motor 30 in order to redirect the efflux as described above, a moveable flap (positioned on or close to the exit nozzle(s) 34) might instead be provided to redirect the efflux.

In some embodiments, the control circuitry 40, 70, may be an application specific integrated circuit (ASIC) rather than a general purpose, programmable processor. The control circuitry 40, 70 may comprise processing circuitry and memory. The memory stores control data (such as one or more look-up tables) defining how the rocket motor(s) 30 is/are to be controlled in response to inputs from the sensor circuitry 42, 80. The processing circuitry processes the inputs from the sensor circuitry 42, 80, accesses the memory and responds in accordance with the stored control data.

In some implementations, the rocket motors 30 are designed such that if they are activated, all of the propellant is burned. This can be achieved by redirecting the efflux of the rocket motors 30 in the manner described above. This reduces the risk to first responders that attend an aircraft landing site.

The aircraft 200 need not include the sensor arrangement illustrated in FIG. 23. In other embodiments, the sensors/sensor circuitry 80 might be a gyroscope-controlled gimbal system or a mass-controlled system that causes at least one sensor to remain pointing groundwards and substantially aligned with the vertical, irrespective of the attitude of the aircraft 200.

Block 803 in FIG. 8 and block 1202 in FIG. 12 relating to inflation of one or more airbags are optional. For example, a parachute comprising one or more airbags could be replaced by a ballistically deployed parachute and vice versa. The ballistically deployed parachute may comprise the airbags. Also, a standard parachute might be used or no parachute at all.

Features described in the preceding description may be used in combinations other than the combinations explicitly described. That is, any features of any embodiment of the emergency landing apparatus 100 could be combined with the features of any other embodiment. Those features might, for instance, relate to when and how the housing 10 is deployed/ejected (if present), when and/or how the rocket motors 30 are controlled (such as initiated and/or re-directed/moved/rotated), when and/or how the parachute 20 is deployed, or any other features.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

I claim:

1. An emergency landing apparatus for an aircraft, the emergency landing apparatus comprising:
   a housing for ejection from the aircraft;
   a parachute, arranged for deployment from the housing, comprising a canopy;
   a rocket motor, positioned in the housing, arranged to provide upwards thrust to control descent of the aircraft during emergency landing of the aircraft;
   a rocket motor initiator, positioned in the housing, arranged to initiate the rocket motor; and
   one or more sensors for sensing ejection of the housing from the aircraft and for arming the rocket motor initiator in response to sensing ejection of the housing from the aircraft.

2. The emergency landing apparatus of claim 1, wherein the parachute is arranged, following ejection of the housing from the aircraft, to move relative to the housing causing passive deployment of the parachute.

3. The emergency landing apparatus of claim 1, further comprising: means for actively deploying the parachute, following ejection of the housing from the aircraft, by ejecting the parachute from the housing.

4. The emergency landing apparatus of claim 1, wherein following deployment of the parachute from the housing, the parachute remains tethered to the housing.

5. The emergency landing apparatus of claim 1, wherein following ejection of the housing from the aircraft, the housing is tethered to the aircraft.

6. The emergency landing apparatus of claim 5, wherein the housing remains tethered to the aircraft following deployment of the parachute.

7. The emergency landing apparatus of claim 1, wherein the housing comprises a first compartment for housing the parachute and a second compartment for housing the rocket motor.

8. The emergency landing apparatus of claim 1, wherein the one or more sensors comprises an inertial switch for sensing the ejection of the housing from the aircraft.

9. The emergency landing apparatus of claim 1, further comprising: control circuitry for controlling the rocket motor initiator to initiate the rocket motor, following deployment of the parachute.

10. The emergency landing apparatus of claim 1, further comprising a launcher for launching the housing from the aircraft in an emergency.

11. The emergency landing apparatus of claim 10, further comprising: sensor circuitry configured to sense an emergency by: (i) sensing a failure of the aircraft indicative of an emergency, (ii) sensing damage to the aircraft indicative of an emergency, and/or (iii) receiving one or more inputs from a user, via user input circuitry of the sensor circuitry, indicating an emergency has occurred.

12. The emergency landing apparatus of claim 11, further comprising: control circuitry for switching the launcher from a safe mode to an armed mode based on one or more inputs from the sensor circuitry indicating an emergency has occurred.

13. The emergency landing apparatus of claim 1, wherein the parachute comprises one or more inflatable airbags arranged to expand the canopy following deployment of the parachute from the housing.

14. The emergency landing apparatus of claim 13, wherein the one or more inflatable airbags are configured to be inflated using a compressed gas or a gas generation formulation.

15. An aircraft comprising:
   An emergency landing apparatus for the aircraft, the emergency landing apparatus comprising:
   a housing for ejection from the aircraft;
   a parachute, arranged for deployment from the housing, comprising a canopy;
   a rocket motor, positioned in the housing, arranged to provide upwards thrust to control descent of the aircraft during emergency landing of the aircraft;
   a rocket motor initiator, positioned in the housing, arranged to initiate the rocket motor; and
   one or more sensors configured to sense ejection of the housing from the aircraft and configured to cause the rocket motor initiator to be armed in response to sensing ejection of the housing from the aircraft.

16. The aircraft of claim 15, further comprising a launcher configured to launch the housing from the aircraft.

17. The aircraft of claim 16, further comprising: at least one power source for powering the aircraft; and a power source for powering a launcher that is independent of the power source for powering the aircraft.

18. A method, comprising:
   sensing ejection of a housing from an aircraft, wherein the housing houses a rocket motor and a parachute comprising a canopy; and
   arming a rocket motor initiator, arranged to initiate the rocket motor, in response to sensing ejection of the housing from the aircraft.

* * * * *